US010814319B2

(12) United States Patent
Dasgupta et al.

(10) Patent No.: US 10,814,319 B2
(45) Date of Patent: Oct. 27, 2020

(54) FUNCTIONALIZED POLYOLEFIN CAPILLARIES FOR OPEN TUBULAR ION CHROMATOGRAPHY

(71) Applicants: Purnendu K. Dasgupta, Arlington, TX (US); Weixiong Huang, Arlington, TX (US)

(72) Inventors: Purnendu K. Dasgupta, Arlington, TX (US); Weixiong Huang, Arlington, TX (US)

(73) Assignee: BOARD OF REGENTS, UNIVERSITY OF TEXAS SYSTEM, Austin, TX (US)

( * ) Notice: Subject to any disclaimer, the term of this patent is extended or adjusted under 35 U.S.C. 154(b) by 600 days.

(21) Appl. No.: 15/395,202

(22) Filed: Dec. 30, 2016

(65) Prior Publication Data

US 2018/0093262 A1 Apr. 5, 2018

Related U.S. Application Data

(60) Provisional application No. 62/402,354, filed on Sep. 30, 2016.

(51) Int. Cl.
*B01D 15/20* (2006.01)
*B01D 15/22* (2006.01)
(Continued)

(52) U.S. Cl.
CPC .......... *B01J 39/26* (2013.01); *B01D 15/206* (2013.01); *B01D 15/22* (2013.01); *B01D 15/362* (2013.01);
(Continued)

(58) Field of Classification Search
CPC ... B01J 39/26; B01J 41/20; B01J 47/02; B01J 20/286; B01J 20/3208; B01J 20/3242;
(Continued)

(56) References Cited

U.S. PATENT DOCUMENTS

| 4,101,460 | A | 7/1978 | Small et al. |
| 4,280,923 | A | 7/1981 | Small et al. |
| | | (Continued) | |

FOREIGN PATENT DOCUMENTS

| EP | 2008090 | 2/2014 |
| WO | 01/67087 | 9/2001 |

OTHER PUBLICATIONS

Diao, X., et al, "Preparation and evaluation of anion exchange open tubular column", Talanta, 101, pp. 91-95. (Year: 2012).*
(Continued)

*Primary Examiner* — Benjamin L Lebron
(74) *Attorney, Agent, or Firm* — Thompson Hine LLP

(57) ABSTRACT

Open tubular capillary columns for liquid and ion chromatography, based upon an ionically impermeable polyolefin capillary having a bore with a sulfonate-group- or amine-group-functionalized internal surface. The capillary columns may include a coating of ion exchanging nanoparticles electrostatically bound to the functionalized internal surface. The capillary columns may be made by exposing the interior surface to a sulfonating reagent comprising chlorosulfonic acid ($ClSO_3H$), preferably from 85 wt % to 95 wt % chlorosulfonic acid at a process temperature of 20 to 25° C. The interior surface may be subsequently exposed to an asymmetrical diamine to form a sulfonic mid-linkage to the diamine, i.e., to form a sulfonamide-linked, amine-group-functionalized internal surface. The coating may be provided by subsequently exposing the interior surface to an aqueous suspension of ion exchanging nanoparticles to electrostatically bond the ion exchanging nanoparticles to the functionalized internal surface.

19 Claims, 17 Drawing Sheets

(51) Int. Cl.
- B01D 15/36 (2006.01)
- B01J 20/286 (2006.01)
- B01J 20/32 (2006.01)
- B01J 39/26 (2006.01)
- B01J 41/20 (2006.01)
- B01J 47/02 (2017.01)
- G01N 30/60 (2006.01)
- G01N 30/96 (2006.01)
- G01N 30/56 (2006.01)

(52) U.S. Cl.
CPC ......... B01D 15/363 (2013.01); B01D 15/367 (2013.01); B01J 20/286 (2013.01); B01J 20/3208 (2013.01); B01J 20/3242 (2013.01); B01J 41/20 (2013.01); B01J 47/02 (2013.01); G01N 30/6078 (2013.01); *B01J 2220/84* (2013.01); *G01N 30/96* (2013.01); *G01N 2030/567* (2013.01); *G01N 2030/965* (2013.01)

(58) Field of Classification Search
CPC .... B01J 2220/84; B01D 15/206; B01D 15/22; B01D 15/362; B01D 15/363; B01D 15/367; G01N 30/96; G01N 30/34; G01N 30/461; G01N 2030/402; G01N 2030/965; G01N 30/6078; G01N 2030/567
See application file for complete search history.

(56) References Cited

U.S. PATENT DOCUMENTS

| | | | |
|---|---|---|---|
| 4,376,047 A | | 3/1983 | Pohl |
| 4,474,664 A | | 10/1984 | Stevens et al. |
| 5,324,752 A | | 6/1994 | Barretto et al. |
| 5,532,279 A | | 7/1996 | Barretto et al. |
| 5,936,003 A | | 8/1999 | Pohl et al. |
| 5,968,363 A | | 10/1999 | Riviello et al. |
| 6,077,434 A | * | 6/2000 | Srinivasan ............. G01N 30/96 204/520 |
| 6,248,798 B1 | | 6/2001 | Slingsby et al. |
| 7,291,395 B2 | | 11/2007 | Pohl et al. |
| 9,132,364 B2 | | 9/2015 | Srinivasan et al. |
| 9,283,494 B2 | | 3/2016 | Pohl et al. |
| 9,310,344 B2 | * | 4/2016 | Liu ....................... G01N 30/482 |
| 10,118,171 B2 | | 11/2018 | Woodruff et al. |
| 2007/0015179 A1 | | 1/2007 | Klapperich et al. |
| 2008/0069731 A1 | | 3/2008 | Liu et al. |
| 2011/0210055 A1 | | 9/2011 | Srinivasan et al. |
| 2014/0170642 A1 | | 6/2014 | Huang et al. |

OTHER PUBLICATIONS

Hutchinson, J., et al, "Towards high capacity latex-coated porous polymer monoliths as ion-exchange stationary phases", The Analyst, 2006, 131, pp. 215-221. (Year: 2006).*
Huang, W., et al, "Functionalized cycloolefin polymer capillaries for open tubular ion chromatography", Analytical Chemistry, 88, 12013-12020. (Year: 2016).*
Dionex Product Manual, CarboPac PA20, Doc. No. 031884, Jul. 2011, 45 pages.
Dionex Product Manual, Disposable Electrodes, Doc. No. 065040, Rev. 7, Jan. 2009, 50 pages.
Dionex Product Manual, Eluent Generator Cartridges, Doc. No. 065018, Jun. 2014, 86 pages.
Dionex Product Manual, IonPac CS10, IonPac CS11, IonPac CG10, IonPac CG11, Doc. No. 034341-06, Sep. 2008, 35 pages.
Dionex Product Manual, Acclaim Trinity Q1, Doc. No. 065475-03, May 2014, 24 pages.
PCT, International Search Report and Written Opinion, International Patent Application No. PCT/US2017/053382, 13 pages (dated Dec. 8, 2017).
Youwen Mo, B.E.; "Investigations in Capillary Liquid Chromatography" a Thesis in Chemistry; pp. 1-90 (Aug. 1997).
Kubáň et al.; "Open Tubular Anion Exchange Chromatography. Controlled Layered Architecture of Stationary Phase by Successive Condensation Polymerization"; Anal. Chem., vol. 79, No. 14, pp. 5462-5467 (Jul. 2007).
Cheong et al., "Comprehensive Overview of Recent Preparation and Application Trends of Various Open Tubular Capillary Columns in Separation Science", Journal of Chromatography A, vol. 1308, pp. 1-24 (2013).
Pyo et al., "High Temperature Open Tubular Capillary Column Ion Chromatography", Analytical Sciences, Supplement, vol. 13, pp. 185-190 (1997).
Breadmore et al., "Open-Tubular Ion-Exchange Capillary Electrochromatography of Inorganic Anions," Analyst, vol. 125, pp. 1235-1241 (2000).
Zhang et al., "Preparation and Characterisation of Dual-Layer Latex-Coated Columns for Open-Tubular Capillary Electrochromatographic Preconcentration of Cations Combined In-Line With Their Separation by Capillary Electrophoresis", Electrophoresis, vol. 27, pp. 1069-1077 (2006).
Zhang, et al. "Polymethylmethacrylate Open Tubular Ion Exchange Columns: Nondestructive Measurement of Very Small Ion Exchange Capacities", Analytical Chemistry, vol. 85, pp. 7994-8000 (2013).
Yang et al., "An Open Tubular Ion Chromatograph", Analytical Chemistry, vol. 86, pp. 11,554-11,561 (2014).
Cail, B. "What's the Difference Between COP and COC?", http://www.cyclo-olefin-polymers.com/Whats_the_difference_between_COP_and_COC.aspx (2013).
Isono et al., Encyclopedia of Polymeric Nanomaterials, pp. 1-8 (2014).
Webpage featuring "(1) Basic Properties (optics)", by Zeon Co., http://zeon.co.jp/business_e/enterprise/speplast/speplast1_8.html (at least as early as 2003).
Knox, et al. "Kinetic Optimization of Straight Open-Tubular Liquid Chromatography", Journal of Chromatography, vol. 186, pp. 405-418 (1979).
Bakker et al., "Sulfonation of Alkenes by Chlorosulfuric Acid, Acetyl Sulfate, and Trifluoroacetyl Sulfate", Eur. J. Org. Chem., pp. 91-96 (1999).
Cremlyn "Chapter 5: The Reaction of Chlorosulfonic Acid with Aliphatic Compounds", Chlorosulfonic Acid: A Versatile Reagent, Royal Society of Chemistry: Cambridge, UK, pp. 146-180 (2002).
Webpage featuring "Basic Properties", http://www.chemicalize.org/structure/#mol=sulfonic+acid+ion&source=fp.
Slingsby et al., "Anion-Exchange Selectivity in Latex-Based Columns for Ion Chromatography", Journal of Chromatography, vol. 458, pp. 241-253 (1988).
Webpage featuring "Phase Ratio", International Union of Pure and Applied Chemistry (IUPAC). "The Gold Book", http://goldbook.iupac.org/P04531.html (2014).
Zhang et al. "Admittance Detector for High Impedance Systems: Design and Applications", Analytical Chemistry, vol. 86, pp. 11,547-11,553 (2014).
Halasz "Mass Transfer in Ideal and Geometrically Deformed Open Tubes, II. Potential Application of Ideal and Coiled Open Tubes in Liquid Chromatography", Journal of Chromatography, vol. 173, pp. 229-247 (1979).
Product information featuring "For Less Than $5,500, Our New 3D™ HPLC System is an Amazing Breakthrough in LC Technology", vol. 57, No. 4, pp. 525 (1985).
Ramshankar, et al. "A Paradox Concerning the Extended Stokes Series Solution for the Pressure Drop in Coiled Pipes", Phys. Fluids, vol. 31, pp. 1339-1347 (1988).

* cited by examiner

FUNCTIONALIZED POLYOLEFIN CAPILLARIES FOR OPEN TUBULAR ION CHROMATOGRAPHY

GOVERNMENT SUPPORT

This invention was made with government support under Grant No. NNX11AO76G awarded by NASA. The government has certain rights in the invention.

BACKGROUND

In chromatography systems, separation columns are arguably the most important functional element of the system. Of the various monolithic, packed, and open tubular (OT) column options used in liquid/ion chromatography, the latter type require the least pressure, permitting the use of simple and easily miniaturizable pneumatic pumping components. A recent review specifically addresses preparation and application trends in open tubular (OT) capillary columns in the separation sciences [1], however most of the reported work pertains to the use of fused silica capillaries, which are not compatible with extremes of pH. In particular, anion exchanger (AEX) coated silica capillaries have previously been used in the single column mode with modestly alkaline or neutral pH eluents [2], however the electrostatic attachment of such materials to surface silanol (—SiOH) functional groups is not stable over long periods of time in significant concentrations of strong base (e.g., 50 mM NaOH), so that work with AEX-functionalized silica capillaries has generally been limited to applications not requiring extremes of pH [3, 4]. While polymethylmethacrylate (PMMA) capillaries are known to be substantially more stable in strong base than silica [5, 6], and have surface carboxylate (—COOH) functional groups that can electrostatically bind AEX materials more strongly than the weaker silanol groups of fused silica capillaries, the applicants have found that AEX latex attachment to PMMA is gradually lost in ~>5 millimolar (mM) hydroxide over long periods of time. Furthermore, neither of the above materials permit the attachment of cation exchanger (CEX) latex particles to the surface of such capillaries, since a positive surface charge is required for attachment of CEX latex to the capillary surface and neither fused silica nor PMMA capillaries provide a pH-stable platform for modifying the capillary surface so as to introduce positive surface charges. Consequently, these substrates are not suitable for use in isocratic or gradient suppressed ion chromatography applications.

SUMMARY

Novel polyolefin based open tubular capillary ion exchange columns are disclosed, preferably having internal diameters of 5 to 50 μm or, even more preferably, 10 to 30 μm. In some implementations, the polyolefin based capillaries have a partially sulfonate-group-functionalized internal surface. In other implementations, the polyolefin based capillaries have a sulfonic mid-linkage to a diamine-group, i.e., a sulfonamide-linked, amine-group-functionalized internal surface. Those functionalized internal surfaces may be manufactured by exposing the interior of a polyolefin capillary to a sulfonating reagent comprising chlorosulfonic acid ($ClSO_3H$; 85-95% w/w) and a diluent such as glacial acetic acid ($CH_3COOH$), anhydrous sulfuric acid ($H_2SO_4$), or a combination thereof (balance) for a period of 2 to 10 hours at room temperature (20-25° C.), and then either converting the resultant chlorosulfonic moieties to sulfonic acid moieties via hydrolysis or linking the resultant chlorosulfonic moieties to an asymmetrical diamine compound (optionally with further modification of the linked compound to form a quaternary amine moiety). The cation ion exchange capacity of the resultant capillary column is controlled by the chlorosulfonic acid concentration and sulfonation time, and may be as high as 300 peq/mm$^2$.

In some implementations, the functionalized internal surface of the capillary column is coated with a layer of ion exchanging nanoparticles. A coated surface may be manufactured by exposing a sulfonate-group-functionalized internal surface to, for example, an aqueous suspension of quaternary-ammonium-group-functionalized latex nanoparticles, whereupon electrostatic attraction between the sulfonate and anion exchanging functional groups electrostatically bonds the nanoparticles to the internal surface. The anion exchange capacity of the resultant column may be as high as 20 peq/mm$^2$. A coated surface may also be manufactured by exposing a sulfonamide-linked, amine-group-functionalized internal surface to, for example, an aqueous suspension of sulfonate-group- or carboxylate-group-functionalized latex nanoparticles, producing similar electrostatic bonding of the nanoparticles to the internal surface.

In some implementations, the polyolefin based capillary is formed as a helical coil having a bend radius of between 0.4 mm and 2.0 mm. The helical coil shape may be manufactured by immersing some or all of a capillary in a heated fluid and then wrapping a section of the capillary around a form.

The applicants have found that the bonding of anion exchanging nanoparticles is much stronger to sulfonated COP (—$SO_3H$ functional groups) than to hydroxylated silica (—OH functional groups) or polymethylmethacrylate (—COOH functional groups). Using exemplary nanoparticles based on AEX-functionalized latex, the applicants show sufficiently persistent bonding to enable use in ion exchange chromatography systems with practical hydroxide eluent concentrations over long periods of time, paving the way for many Suppressed Conductometric Capillary Ion Chromatography (SCCIC) applications. The applicants have also determined that when the interior surface is heavily sulfonated, neutral analytes may elute after anion analytes in both coated and uncoated columns due to anion exclusion effects on anionic analytes. The degree of sulfonation of the internal surface may be thus be varied to alter the position of the water dip, to cause a separation between elemental anions, organic anions, and neutrals (such as alcohols), and/or to cause a separation among aprotic neutrals. Similarly, the degree of sulfonation, upon reaction with a suitable asymmetrical diamine, can allow for the manipulation of the timing of the water dip to beneficially position the dip's effect upon detector response to a time that will not interfere with the detection of early eluting alkali metal cations or weakly retained amines. Finally, the applicants have found that these columns, if softened at modestly elevated temperatures (e.g., in boiling water), can be coiled down to <1 mm coil radii, producing very low-volume, low-dispersion separation columns due to the beneficial effects of centrifugal force on mass transfer to the stationary phase (the sulfonated polyolefin material and, when present, the electrostatically bound AEX nanoparticle coating).

DETAILED DESCRIPTION

Figure 1:
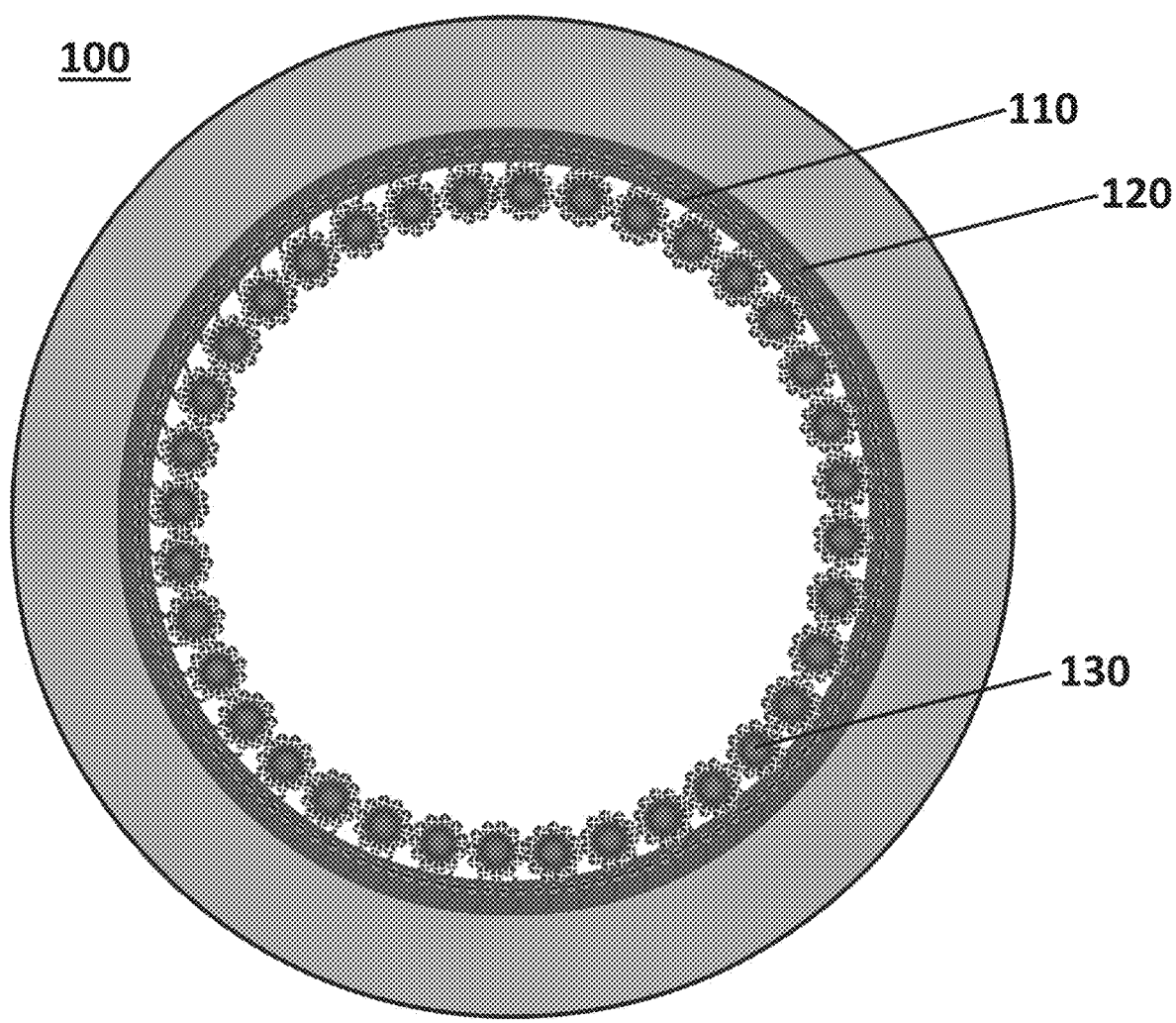
FIG. 1 is a schematic cross-sectional view of an exemplary open tubular capillary ion exchange column.

In describing different aspects of the polyolefin based open tubular capillary ion exchange columns, reference is made to FIG. 1. However, it will be appreciated that the interior regions of the illustration have been exaggerated and are not shown to scale. Additionally, exemplary systems for manufacturing and using the disclosed columns are shown, but it will be appreciated that other systems may be used to carry out the described manufacturing processes, and that the disclosed columns may be used in various Suppressed Conductometric Capillary Ion Chromatography (SCCIC) systems.

In general, each open tubular capillary ion exchange column 100 comprises a capillary drawn from a stock of polyolefin material. In some implementations, the material is a cycloolefin material, such as a norbornene-type (ring-opening-metathesis-polymerized 8,9,10-trinorborn-2-ene) material [7, 8]. In other implementations, the material is a cycloolefin copolymer material, such as a norbornene-ethylene-type (chain copolymerization of 8,9,10-trinorborn-2-ene with ethylene) material [7, 8]. One such material, marketed as ZEONEX® 330R by Zeon Corp. (Tokyo, Japan), exhibits a very low glass transition temperature (123° C.) [9] with the added benefit of very low fluorescence, optical transparency down to 290 nm at capillary scale thicknesses, and a small additional window of optical transparency centered at ~250 nm. Capillaries may be manufactured from cylinders (e.g., 7.35 cm in diameter×20 cm long) machined with a concentric hole (e.g., 3.97 mm or 5/32 in. i.d.) into a preform that has the same o.d./i.d. aspect ratio as the target o.d./i.d. of the capillary (e.g., 370 μm o.d. and 20 μm i.d.). Such a preform may then be extruded into open tubular capillaries using known techniques or by a commercial extruder such as Paradigm Optics, Inc. (Vancouver, Wash., USA). Using a commercial extrusion service, applicants have obtained capillaries having a 360 to 375 μm o.d., a 19 to 28 μm i.d., and a bore uniformity of ±2 μm per meter. While it is well known that column efficiency and speed of separation increase with decreasing capillary column bore diameter (with an optimum inner diameter of 0.26 μm suggested theoretically for OT liquid chromatography [10]), it will be appreciated that difficulties in column preparation, reproducible sample injection, and detection sensitivity, as well as the potential for column blockage, also increase with decreasing capillary bore diameter so that, in the applicants' experience, column diameters of 10 to 30 μm currently provide an optimum range of compromise.

The internal surface 110 of the capillary is chemically modified to substitute some polymer chain hydrogen atoms with sulfonate functional groups, i.e., to have a sulfonate-functionalized internal surface region 120 surrounded by non-functionalized and ionically impermeable material. In principle, the polyolefin material should consist of chains of saturated aliphatic hydrocarbon backbone and/or rings (from linear, branched, or cyclic olefin monomers); however, significant optical absorption below 300 nm suggests that residual olefinic moieties will be present in commercially available materials, and it is those moieties that will likely be attacked first with the formation of some α-chloro β-alkanesulfonic acids [11]. Chlorosulfonic acid attack on the material will otherwise replace an H atom (reactivity: tertiary>secondary>primary H) with a sulfonate ($-SO_3H$) group, liberating HCl [12]. Thus it should be appreciated that sulfonation should principally, but will not exclusively, sulfonate originally unsaturated moieties.

Figure 2:
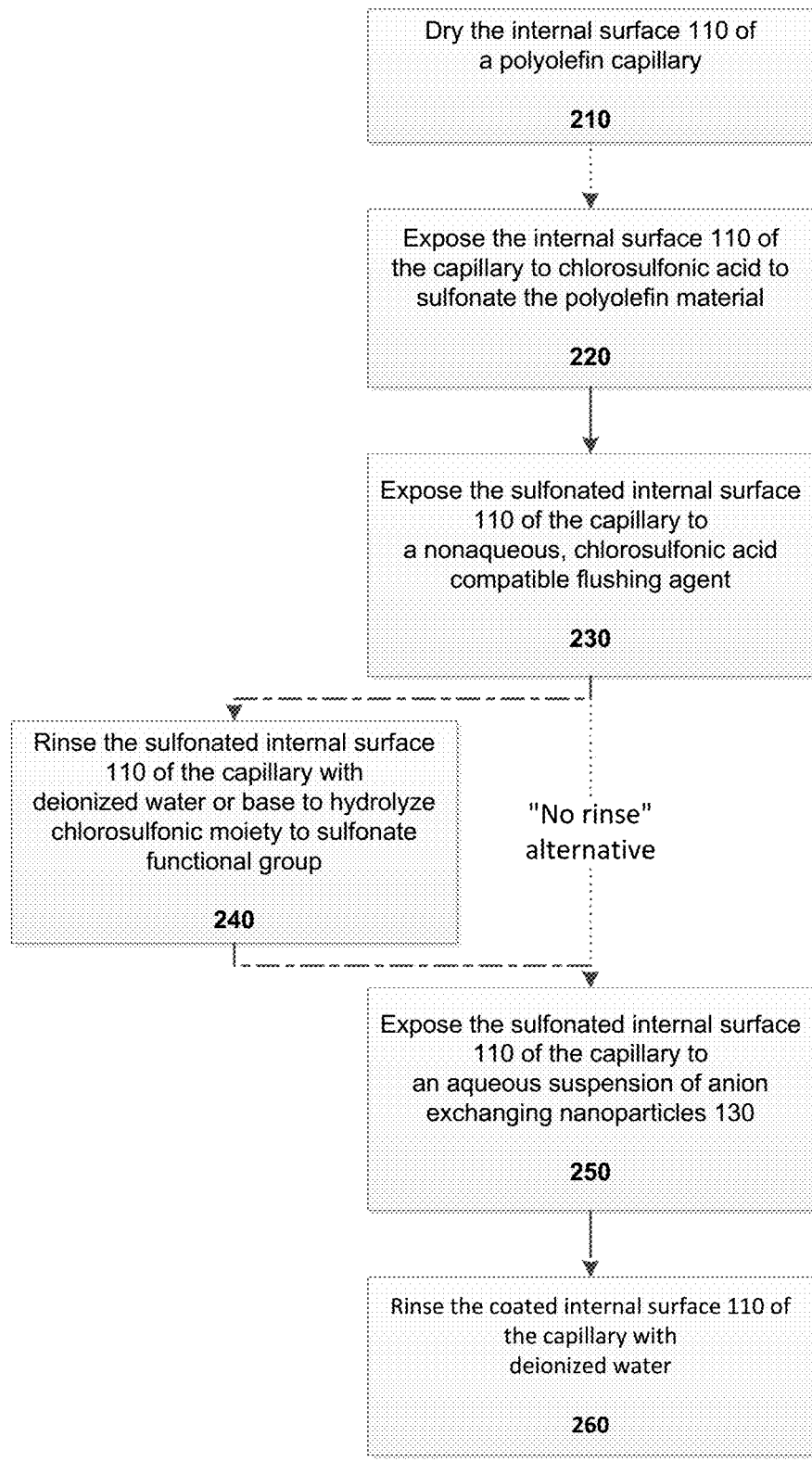
FIG. 2 is a flow chart of a process for manufacturing a polyolefin based open tubular capillary ion exchange column without (through step 240) and with (through step 260) a coating of AEX nanoparticles.
Figure 3:
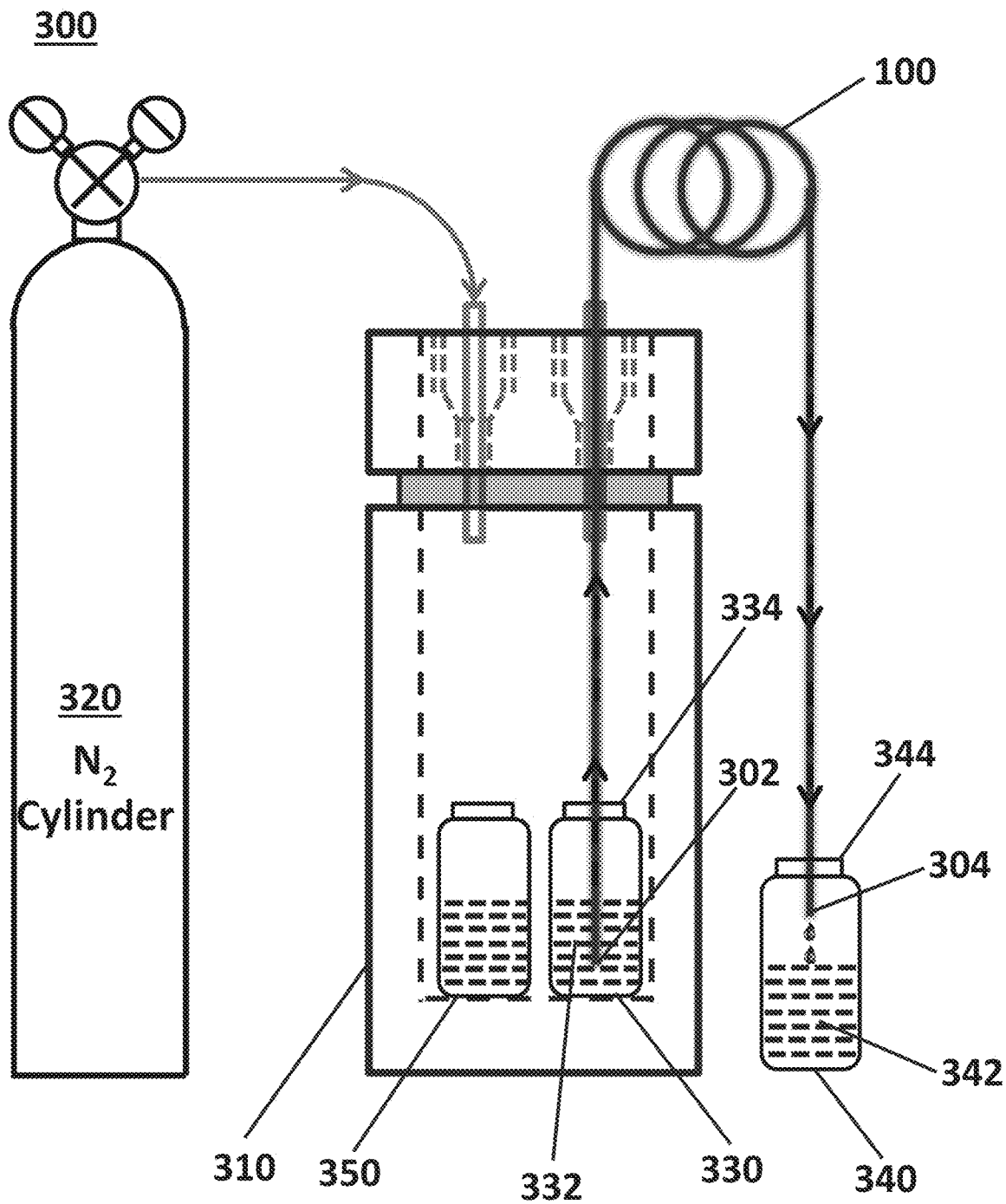
FIG. 3 is a schematic diagram of an exemplary system for sulfonating polyolefin capillaries.

FIG. 2 shows a process for manufacturing the sulfonate-functionalized internal surface 110, i.e., region 120, using chlorosulfonic acid ($ClSO_3$). It is important to note that this acid is an extremely aggressive reagent that reacts explosively with water, generating H2SO4 and HCl fumes and potentially causing severe burns. Thus the process preferably includes an initial step (process step 210) of drying the internal surface 110 of a COP capillary. For example, dry nitrogen gas may be passed through the capillary at 60-100 psi for 5-10 min to dry it thoroughly. With a dry capillary, the process (process step 220) exposes the internal surface 110 of the capillary to chlorosulfonic acid to sulfonate the polyolefin material. The acid may be provided as pure chlorosulfonic acid, but is preferably provided in a sulfonating reagent comprising from 85 wt % to 95 wt % chlorosulfonic acid and a balance of a nonaqueous, chlorosulfonic acid compatible diluent. For example, glacial acetic acid ($CH_3COOH$), anhydrous sulfuric acid ($H_2SO_4$), or a combination thereof may be used as the diluent. In an exemplary system 300 for performing the process, shown in FIG. 3, one end of the capillary 302 is connected to a pressurizable reservoir 310 that is connected to a source of dry nitrogen gas 320. The capillary may then be dried (process step 210) by simply pressurizing the reservoir 310. After drying, the end of the capillary 302 may be lowered into a reagent vial 330 positioned within the reservoir 310 and containing a small volume (1 mL) of sulfonation reagent 332. The reagent vial 330 is preferably covered with an inert membrane 334 to provide a measure of spill resistance, so that the end of the capillary must puncture the membrane as it is lowered to the bottom of the vial. Depending upon the length and bore of the capillary, the reservoir may be pressurized to 10-60 psi to pump the sulfonating agent through the capillary. The other end of the capillary 304 may be inserted into a waste vial 340 to collect expelled reagent for disposal. The waste vial 340 may contain a nonaqueous, chlorosulfonic acid compatible diluent 342, such as glacial acetic acid, to reduce the potential effects of an inadvertent exposure to water. The waste vial may also be covered with an inert membrane 344 to provide a measure of spill resistance. After exposure, the process preferably exposes the sulfonated internal surface 110 of the capillary to a nonaqueous, chlorosulfonic acid compatible flushing agent (process step 230). The flushing agent used in process step 230 may be the same as or different than the diluents mentioned above. For example, the capillary may be pneumatically flushed by substituting a vial 350 of glacial acetic acid for the reagent vial 330 and pressurizing the reservoir 310 to 80 psi for 30 min to remove residual chlorosulfonic acid from the capillary bore and sulfonated region 120. Alternately, the capillary may be pneumatically flushed with a gas and any residual sulfonating agent allowed to expend itself. Then, in process step 240 the chlorosulfonated internal surface 110 of the capillary may be rinsed with deionized water or a base to hydrolyze the resultant chlorosulfonate moieties to sulfonate functional groups. For example, the column 100 may be connected to a HPLC pump and rinsed with deionized water at 1 to 10 μL/min for 20 to 100 hours to facilitate hydrolysis as well as to remove residual sulfonating agent, flushing agent, or other ions and unbound chemical species, as discussed in further detail below. Alternately, the column 100 may be rinsed with a solution of at least 10 mM alkali metal hydroxide for 5 to 25 hours to accelerate the rate of hydrolysis of the chlorosulfonate moiety.

In some implementations, the sulfonate-functionalized internal surface 110 of the column 100 is coated with a layer of anion exchanging nanoparticles 130. Carrying out multi-step chemistry in small bore capillaries to provide differing or mixed separation domains can be difficult and result in low yields, while coating with functionalized nanoparticles can be accomplished by passing a suspension through an oppositely charged capillary. For the present columns, electrostatic attraction between the negatively charged sulfonate functional groups of the internal surface 110 and the positively charged anion exchanging functional groups on the exterior surface of AEX nanoparticles 130 electrostatically bonds the nanoparticles to the internal surface 110, forming a monolayer that permits efficient stationary phase mass transfer to the AEX functional groups and consistent mass transfer behavior for neutrals through the nanoparticulate layer to the sulfonate-functionalized region 120. For example, the applicants have electrostatically bonded quaternary-ammonium-group-functionalized latex nanoparticles with a median diameter of 65 nm, manufactured by Thermo Fisher Scientific (Waltham, Mass., USA) for use in its Dionex IonPac AS18 hydroxide-selective anion exchange column, to such functionalized internal surfaces. Referring again to FIG. 2, in process step 250 the sulfonated internal surface 110 of the capillary may be exposed to an aqueous suspension of anion exchanging nanoparticles 130. For example, a suspension of AS18 latex nanoparticles may be prepared by diluting a concentrated suspension with neutral or modestly alkaline water (e.g., a 10 mM LiOH solution) to a 10% (wt/v) suspension of nanoparticles. It will be appreciated that process step 250 may be performed without first performing process step 240, so that the suspension solution itself facilitates hydrolysis of chlorosulfonate moieties into sulfonate functional groups. The suspension may be pumped through the capillary using the system 300, although applicants found it preferable to conserve the suspension by using two such systems, placing the other end of the capillary 304 in a vial in a second pressurizable reservoir (not shown) and alternately pressurizing one reservoir 310 while venting the other to cause the suspension to flow through the capillary, back and forth between vials. Finally, in process step 260 the coated internal surface 110 of the capillary may be rinsed with deionized water to clean the coated column. For example, the column 100 may be connected to a HPLC pump and rinsed at 1 to 10 μL/min for 0.5 h to 2 h to remove the suspension fluid and unbound residual nanoparticles from the bore.

Figure 4:
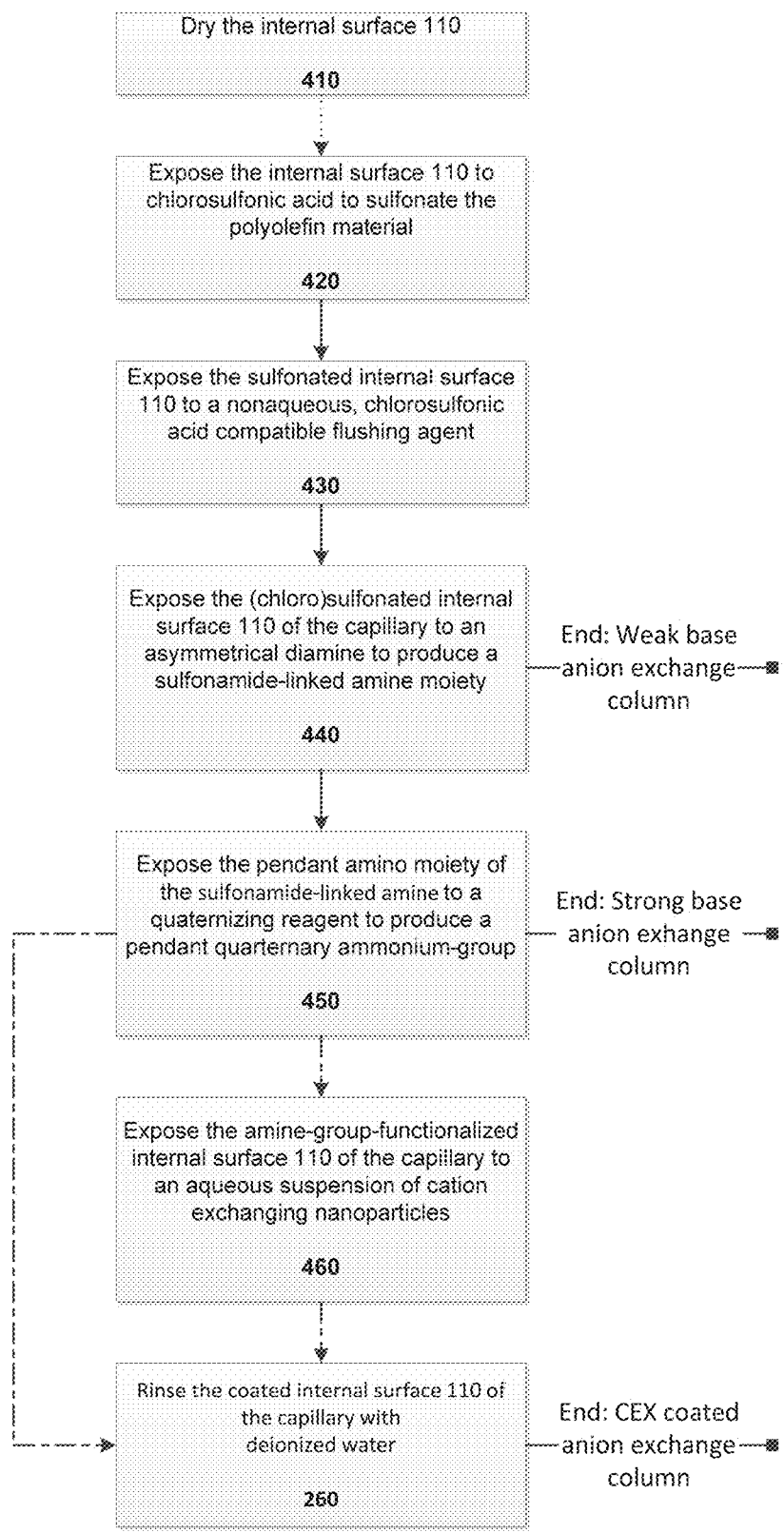
FIG. 4 is a flow chart of a process for manufacturing a polyolefin based open tubular capillary ion exchange column without (through step 440 or 450) and with (through step 460) a coating of CEX nanoparticles.

FIG. 4 shows a related process for manufacturing a sulfonamide-linked, amine-group-functionalized internal surface 110 using chlorosulfonic acid ($ClSO_3$). Process steps 410-430 are identical to process steps 210-230 as described above. Then, the process (process step 440) exposes the internal surface 110 of the capillary to an asymmetrical diamine to produce a sulfonamide-linked amine moiety. For example, the process step 440 may expose the internal surface to an aminating reagent comprising N—N-dimethylethylenediamine to produce a sulfonamide-linked dimethylaminoalkane. It should be noted that both methyl groups in this exemplary compound are attached to the same amine group to create the asymmetric characteristic. The chlorosulfonic acid moiety and an amine of the diamine participate in a condensation reaction to yield a sulfonamide-linked amine moiety and hydrochloric acid, and thus the aminating reagent may also include a base such as an aromatic unsymmetrical diamine to neutralize the evolved acid. The resultant sulfonamide-linked, amine-group-functionalized internal surface 110 may serve as a weak base anion exchange material. Optionally, the process (process step 450 may expose the pendant amino moiety to a suitable methylation reagent such as methyl iodide or dimethyl sulfate to produce a pendant quaternary ammonium-group and thus a quaternary amine-group-functionalized internal surface 110 serving as strong base anion exchange material.

In some implementations, the sulfonamide-linked, amine-group-functionalized internal surface 110 of the column 100 is coated with a layer of cation exchanging nanoparticles 132. In these implementations, electrostatic attraction between the positively charged amine functional groups of the internal surface 110 and negatively charged cation exchanging functional groups on the exterior surface of CEX nanoparticles 132 electrostatically bonds the nanoparticles to the internal surface 110, forming a monolayer that, like in the case of AEX nanoparticles on CEX surfaces, permits efficient stationary phase mass transfer to the CEX functional groups. For example, sulfonate- and carboxylate-functionalized latex nanoparticles, such as those manufactured by Thermo Fisher Scientific (Waltham Mass.) for use in its Dionex IonPac CS10 (275 nanometer diameter cation exchange latex particles with 5% crosslinking and sulfonic acid groups) and Acclaim Trinity Q1 (85 nanometer diameter cation exchange latex particles with 2% crosslinking and carboxylic acid groups) cation exchange columns, to such functionalized internal surfaces. In process step 460 the amine-group-functionalized internal surface 110 of the capillary may be exposed to an aqueous suspension of cation exchanging nanoparticles 130. For example, a suspension of CS10 or Acclaim Trinity Q1 latex nanoparticles may be prepared by diluting a concentrated suspension with 0.1 M hydrochloric acid in the case of the CS10 latex or using 0.1 M ammonium hydroxide in the case of Acclaim Trinity Q1 latex. The suspension may be pumped through the capillary using the system 300 or dual-system variant described above, or any other suitable pumping apparatus. Finally, in process step 470 the coated internal surface 110 of the capillary may be rinsed with deionized water to clean the coated column. For example, the column 100 may be connected to a HPLC pump and rinsed at 1 to 10 µL/min for 0.5 h to 2 h to remove the suspension fluid and unbound residual nanoparticles from the bore.

EXAMPLES AND RESULTS

Working Example 1

Material: ZEONEX® 330R (norbornene-type cycloolefin polymer)
Dimensions: 370 µm o.d.; 28 µm i.d.
Sulfonation conditions: 2 h exposure to 95.1% ClSO$_3$H: 4.9% CH$_3$COOH @20-25° C.
Mean resultant cation exchange capacity: 3.2 peq./mm$^2$ Working Example 2

Material: ZEONEX® 330R (norbornene-type cycloolefin polymer)
Dimensions: 370 28 µm o.d.; 28 µm i.d.
Sulfonation conditions: 6 h exposure to 95.1% ClSO$_3$H: 4.9% CH$_3$COOH @20-25° C.
Mean resultant cation exchange capacity: 70.1 peq./mm$^2$ Working Example 3

Material: ZEONEX® 330R (norbornene-type cycloolefin polymer)
Dimensions: 370 µm o.d.; 28 µm i.d.
Sulfonation conditions: 2 h exposure to 95.1% ClSO$_3$H: 4.9% CH$_3$COOH, w/ dissolved cycloolefin polymer reaction product, @ 20-25° C.
Mean resultant cation exchange capacity: 23.9 peq./mm$^2$ Working Example 4

Material: ZEONEX® 330R (norbornene-type cycloolefin polymer)
Dimensions: 370 µm o.d.; 28 µm i.d.
Sulfonation conditions: 2 h exposure to 90% ClSO$_3$H: 10% CH$_3$COOH @20-25° C.
Mean resultant cation exchange capacity: 0.4 peq./mm$^2$
Optional coating material: AS18 latex (65 nm particulate latex with 8% crosslinking of alkanol quaternary ammonium)
Mean resultant anion exchange capacity: 17.8 peq./mm$^2$ Working Example 5

Figure 5:
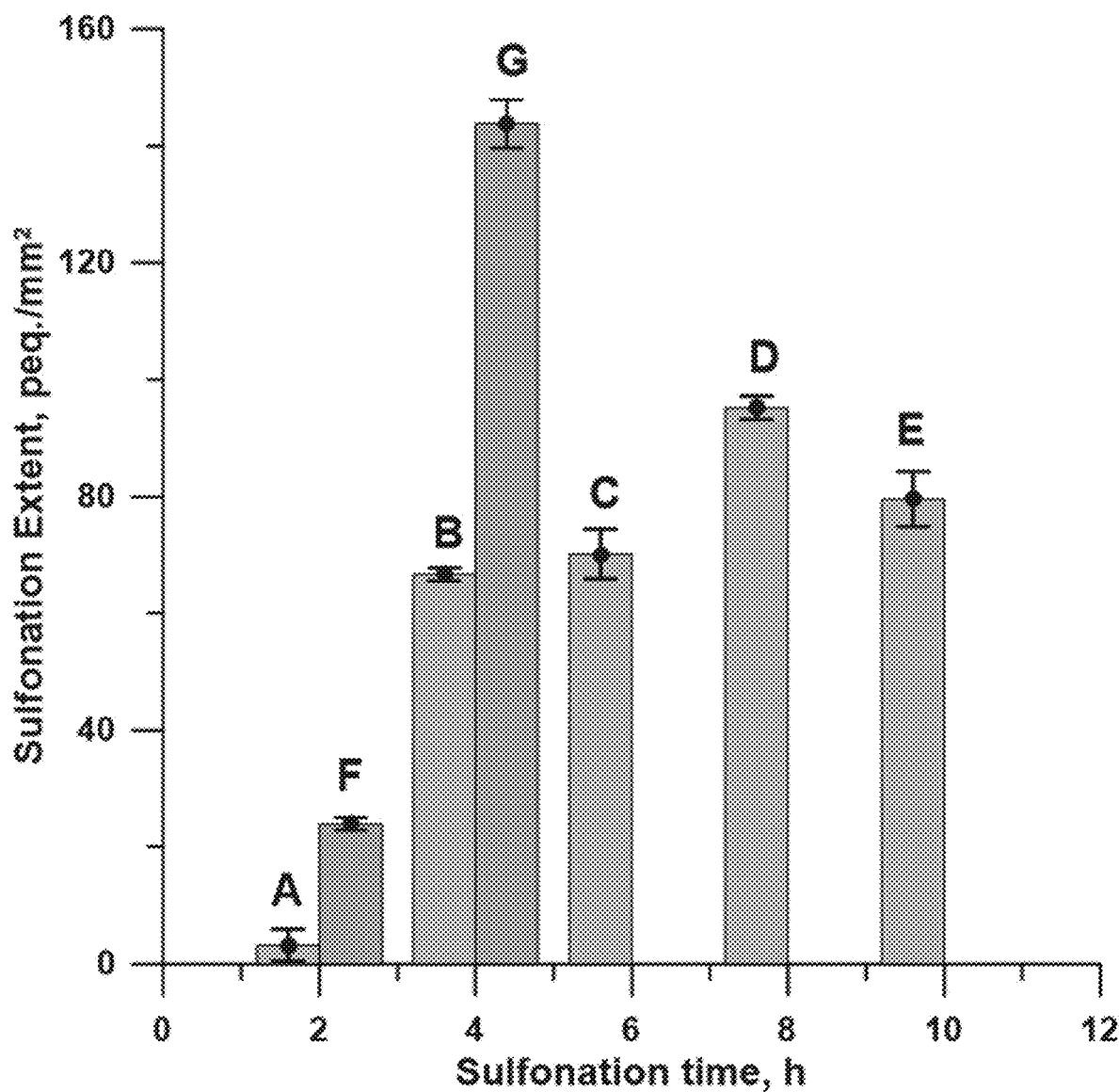
FIG. 5 is a plot illustrating the extent of sulfonation (as measured by cation exchange capacity) versus time of exposure to a sulfonating reagent.

Material: ZEONEX® 330R (norbornene-type cycloolefin polymer)
Dimensions: 370 µm o.d.; 28 µm i.d.;
Sulfonation conditions: 6 h exposure to 90% ClSO$_3$H: 10% CH$_3$COOH @20-25° C.
Mean resultant cation exchange capacity: 3 peq./mm$^2$
Optional coating material: AS18 latex
Mean resultant anion exchange capacity: 28 peq./mm$^2$ Sulfonation Process and Performance To applicants' knowledge, there has not been any systematic characterization of the sulfonation of polyolefin materials, including or excluding cycloolefin polymer materials, by chlorosulfonic acid. In general, sulfonation rate will be controlled by the concentration of chlorosulfonic acid in the sulfonating reagent, the process temperature, and the exposure time of the material to the sulfonating reagent. Although it may be possible to use a sulfonating agent comprising pure chlorosulfonic acid in an artificially cooled process, applicants have found that at room temperature the pure acid attacks cycloolefin polymer materials at an uncontrollable rate. For a process conducted at room temperature (20 to 25° C.), a sulfonating agent comprising 85 wt % to 95 wt % chlorosulfonic acid has been found to produce a controllable and efficient reaction rate. FIG. 5 shows the degree of sulfonation observed versus time for a room temperature process 200 using a sulfonating agent comprising 95.1 wt % ClSO$_3$H and 4.9 wt % CH$_3$COOH. The extent of sulfonation was measured as picoequivalents (peq.) of cation exchange capacity per unit surface area, assuming a nominal inner surface area equal to that of a smooth, nonporous cylinder, for a norbornene-type capillary material. The average extent of sulfonation with associated error bars, for paired samples (two per time period), is shown for an otherwise identically processed set of 28 µm i.d. capillaries where exposure to the sulfonating reagent was terminated at 2 h (Working Example 1; A), 4 h (B), 6 h (Working Example 2; C), 8 h (D), and 10 h (E), respectively. Between the first paired sample with 2 h exposure (A: 3.2±2.7 peq/mm$^2$) and the second paired sample with 4 h exposure (B: 66.6±1.1 peq/mm$^2$) the sulfonation extent increased dramatically, but only modest further increases were seen in samples with 6 h (C) and 8 h (D) exposure. At 10 h exposure (E), sulfonation extent was significantly less that that with 8 h exposure. As a benchmark, the theoretically computed surface area occupied by a sulfonic acid group is 0.18-0.21 nm$^2$ (depending on its orientation [13]), from which one can compute a maximum monolayer coverage of 8 to 9 peq/mm$^2$ (note that the maximum capacity of a thoroughly sulfonated macroporous 300 m$^2$/g surface area cation exchange resin is ~1 meq/g, translating to ~3.3 peq/mm$^2$). Therefore it is clear that for all but the 2 h exposure time, the sulfonation reaction must have continued well beyond a monolayer coverage. It is also important to note that the reported capacities were obtained only after 100+ h of washing at high flow rates, as described in step 240 and further discussed below. Without wishing to be bound by theory, applicants believe that sulfonate group exchange capacity dramatically increases between 2 and 4 h of exposure due to reagent attack upon newly exposed underlayers of COP material, and that after 4 h of exposure further sulfonation is accompanied by ring opening so as to produce dangling polymer chains that can be washed out of the interior region 120, particularly off of the interior surface 110 proper, over moderate periods of time. Even with pure water as the eluent, heavily sulfonated columns have been observed to exhibit greater detector noise that diminishes only with continued washing and some associated loss of sulfonate functional group exchange capacity.

Applicants unexpectedly found that the sulfonation reaction is autocatalytic. When the sulfonating reagent contacts the COP material, some entity is formed that colors the sulfonating reagent, slowly transforming it from clear to yellow to dark brown. This is accompanied by an increase in sulfonating agent viscosity (flow rate through a capillary will decreases at constant pressure). FIG. 5 also shows the degree of sulfonation observed versus time for a room temperature process 200, using a 'partially spent' sulfonating reagent (95.1 wt % $ClSO_3H$ and 4.9 wt % $CH_3COOH$ after 24 h of contact with COP material, light yellow in color). This sulfonating reagent is much more effective—a paired sample with 2 h exposure (Working Example 3; F: $23.9\pm1.1$ peq/mm$^2$) and a paired sample with 4 h exposure (G: $143.8\pm4.1$ peq/mm$^2$) had significantly greater sulfonation extents than corresponding pairs (A) and (B), respectively, with exposure to 'fresh' sulfonating reagent. Preferably, to reduce required exposure time while maintaining reproducible sulfonation behavior, the sulfonating reagent is spiked with a chemical entity (or entities) produced by dissolving a small amount of COP material in virgin sulfonation reagent over about 48 h. For example, applicants' practice has been to place small sections of COP capillary (about 4 cm of collective length per gram of virgin sulfonation reagent) in the sulfonation reagent about 48 h before use. It will be appreciated that other forms of COP material having a high surface area to volume ratio could be used.

For the diluent, inert diluents like $CHCl_3$ or $CH_2Cl_2$ have been recommended for sulfonation reactions using $ClSO_3H$ [12], but these chlorinated solvents dissolve the COP substrate. Applicants have found that concentrated acids such as $CH_3COOH$, $H_2SO_4$, and $CH_3SO_3H$ are suitable for use as diluents. Other nonaqueous, chlorosulfonic acid compatible materials, including nitroaromatics such as nitrobenzene and nitroxylene, alkyl sulfonic acids such as ethane sulfonic acid and propane sulfonic acid, and carboxylic acid anhydrides such as acetic anhydride, may also be used while maintaining compatibility with polyolefin materials. Below about 80 wt % $ClSO_3H$, no sulfonation appears to occur at room temperature in 24 h. Although sulfonation could be expected to occur with $ClSO_3H$ concentrations below 85-95 wt % at elevated process temperatures, COP capillaries cannot be heated beyond their comparatively limited glass transition temperature (e.g., 130 to 150° C. for commercial COP materials). Beyond autocatalysis, sulfonation appears to be exclusively dependent on the $ClSO_3H$ concentration—substituting $H_2SO_4$ for $CH_3COOH$ does not produce any significant difference in sulfonation rate.

Figure 6:
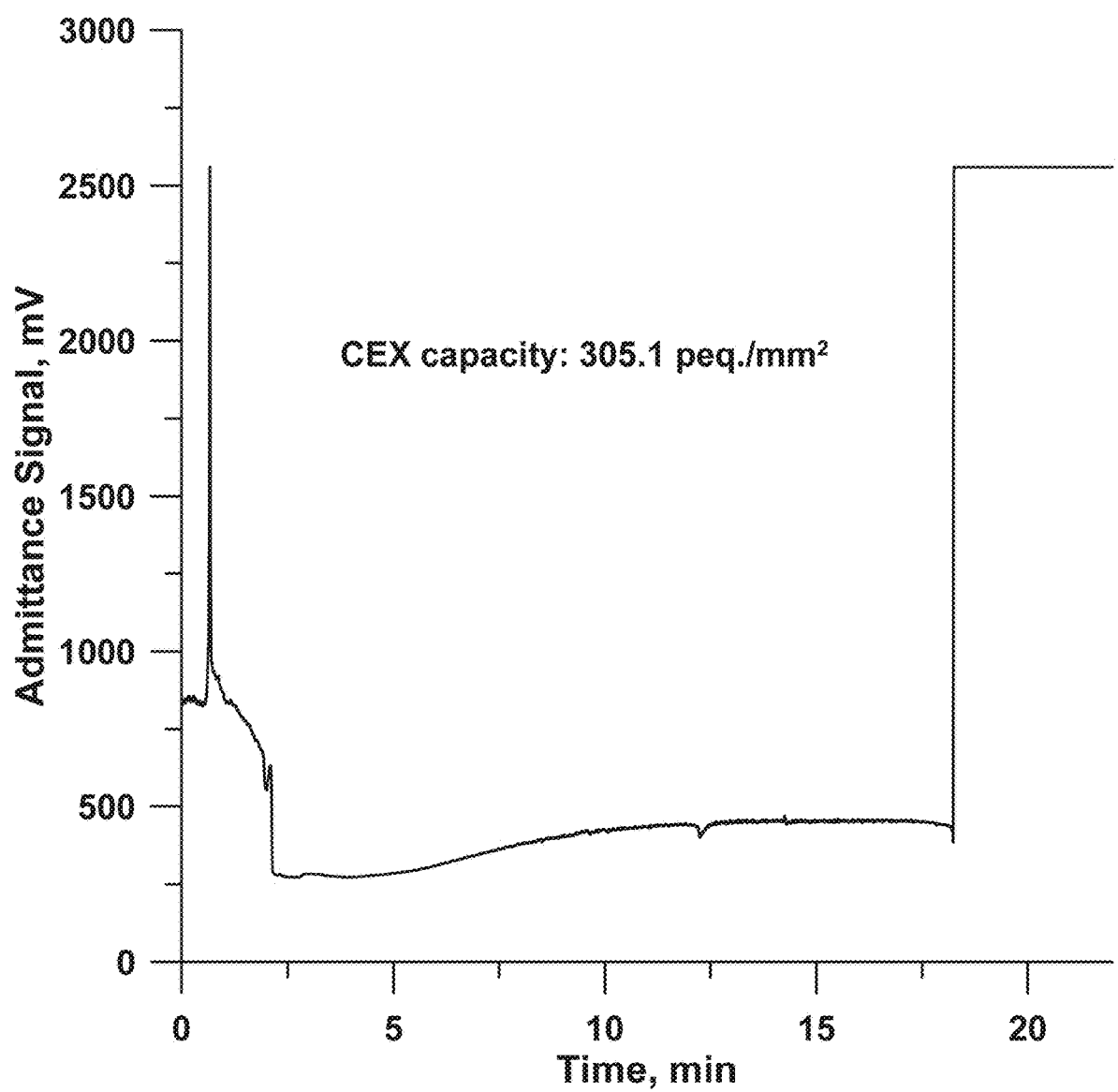
FIG. 6 shows a cation exchange capacity determination for an exemplary open tubular capillary ion exchange column, showing breakthrough of a pumped NaOH solution at ~18 minutes.

Depending upon exposure time, applicants have routinely attained columns with a cation exchange (CEX) capacity of 200 peq/mm$^2$, and even exceeding 300 peq/mm$^2$. For example, FIG. 6 shows a column capacity determination for an 870 mm long (effective length), 370 μm o.d./28 μm i.d. capillary sulfonated according to process steps 210-250 with exposure to a 95.1 wt % $ClSO_3H$ and 4.9 wt % $CH_3COOH$ sulfonating reagent, pumped by pressurizing reservoir 310 to 40 psi, for 5 h at room temperature. Column capacity was determined by regenerating the column with 5.4 millimolar (mM) $H_2SO_4$, then monitoring for breakthrough of a 7.2 mM KOH solution pumped at 0.21 μL/min. Observed capacity for the column was 305 peq/mm$^2$. For comparative purposes, applicants have measured capacities of only ~1 peq/mm$^2$ on PMMA columns (with native —COOH functional groups) after a strong base hydrolytic step [5].

Figure 7:
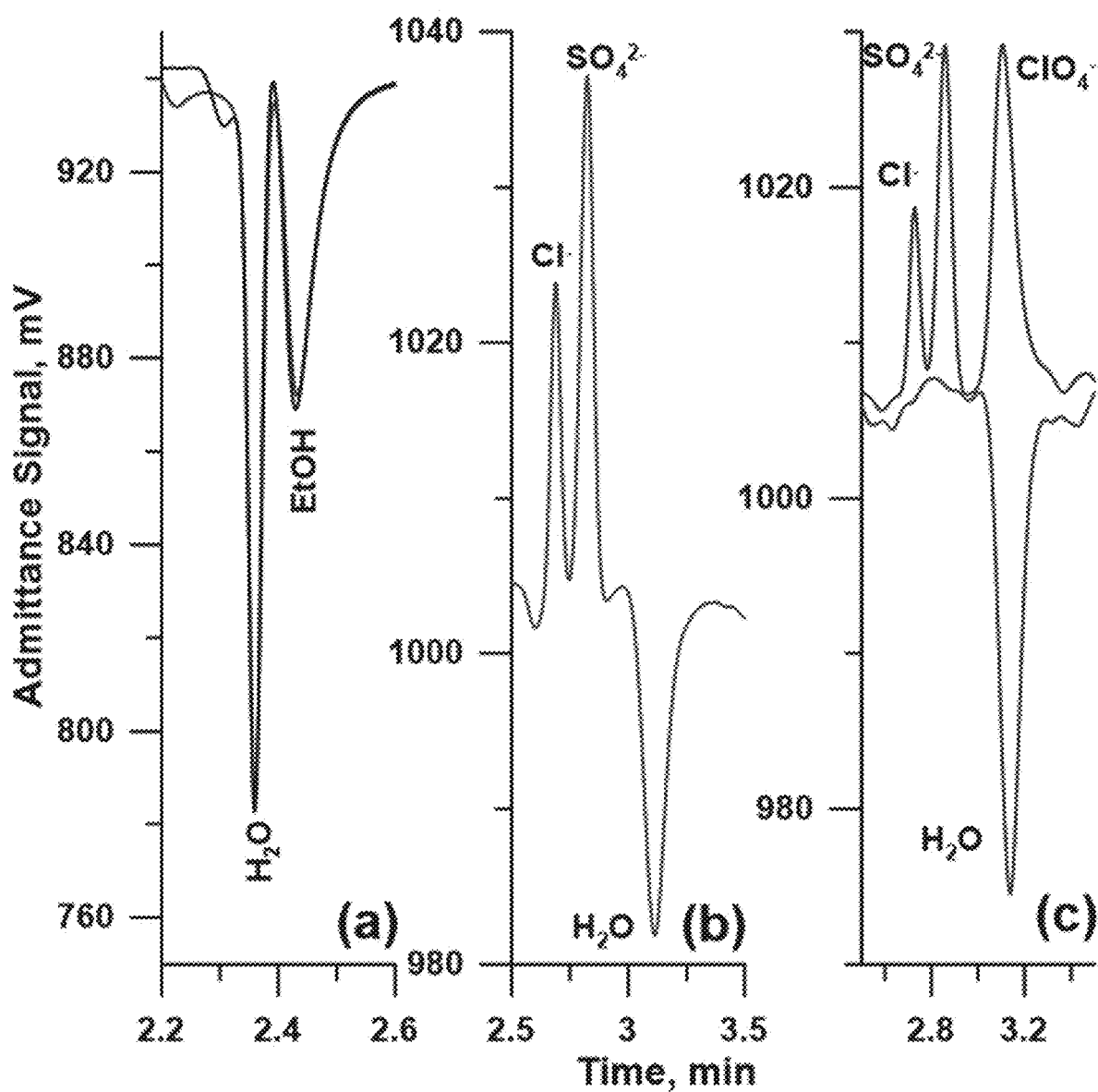
FIG. 7 shows chromatograms obtained by employing a heavily sulfonated COP based capillary column to separate (a) water and ethanol, and a heavily sulfonated, AEX latex coated COP based capillary to separate (b) early eluting inorganic anions from the sample water dip. (c) shows a separation where a more strongly retained inorganic anion co-elutes with the sample water dip.

Most cation exchange separations should be conducted with columns having a sulfonate-group associated cation exchange capacity of at least 0.5 peq/mm$^2$, up to about 4 peq/mm$^2$. However, highly sulfonated COP based columns, much like highly sulfonated gel-type resins, show ion exclusion behavior not previously reported for an open tubular capillary format column. FIG. 7 shows an exemplary chromatogram (a) for a highly repeatable separation of water and ethanol (50:50 ratio, 5 nL sample volume) separated using a 750 mm long (effective length), 370 μm o.d./28 μm i.d. capillary with a CEX capacity of $125\pm12$ peq/mm$^2$ using a 0.5 mM HCl eluent pumped at 30 psi (flow rate of 200 nL/min). A clear separation between the water and ethanol peaks is achieved. The applicants note that even when such highly sulfonated columns are coated with anion exchanging nanoparticles 130, the underlying sulfonated region 120 remains accessible, so that ion exchange and neutral retention behavior (through partition into the water phase associated with the sulfonate sites) proceeds simultaneously and can cause sample water to be retained substantially more than some anionic analytes, as in exemplary chromatogram (b), or co-eluting with some strongly retained anion, as in exemplary chromatogram (c). In the illustrated cases, separations were performed using an AS18 latex coated, 210 mm long (effective length) capillary with a CEX capacity of $1251\pm1$ peq/mm$^2$ using a 1.0 mM timesic acid (pH 4.5) eluent pumped at 13 psi (flow rate of 44 nL/min). For chromatogram (b), the sample consisted of 1.5 nL of solution containing 0.5 mM chloride and sulfate. For chromatogram (c), the sample consisted of 1.5 nL of solution containing 0.5 mM chloride, sulfate, and perchlorate. Because perchlorate co-eluted with the water peak in this system, chromatogram (c) includes a plot showing the water dip from a sample of deionized water for comparison. As mentioned above, the position of the water dip could be altered by altering the extent of sulfonation of the column. Such mixed but independent retention modes may offer intriguing possibilities for simultaneous separations of anions from neutrals with appropriate detectors, as well as detection of early eluters that would otherwise be masked by the water dip.

Figure 8:
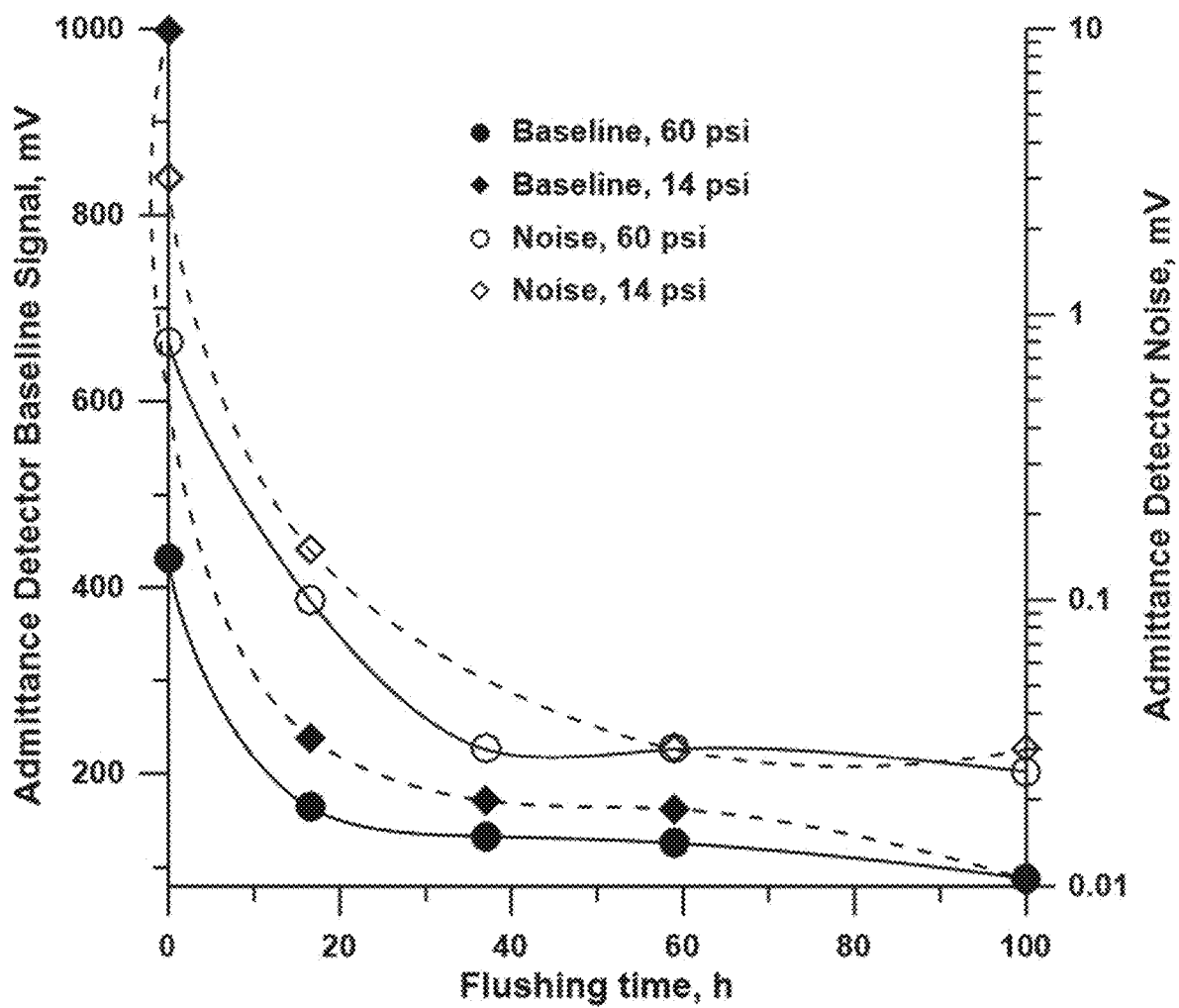
FIG. 8 includes plots of baseline conductance and baseline noise (inset plot) versus time in a rinsing step 240.

Highly sulfonated columns (cation exchange capacity >200 peq/mm$^2$) exhibit some decrease in exchange capacity upon prolonged washing with water, with the effluent baseline conductance decreasing with increasing flow rate. This may indicate that conductive material is washing off the interior surface 110 of the column 100, possibly oligomers or dangling open chains from ring-opening sulfonation reactions. As shown in FIG. 8, both the baseline conductance and baseline noise reach a stable low value only after extensive an extensive rinsing step of 20 to 100 h.

Coating Process and Performance

Figure 9:
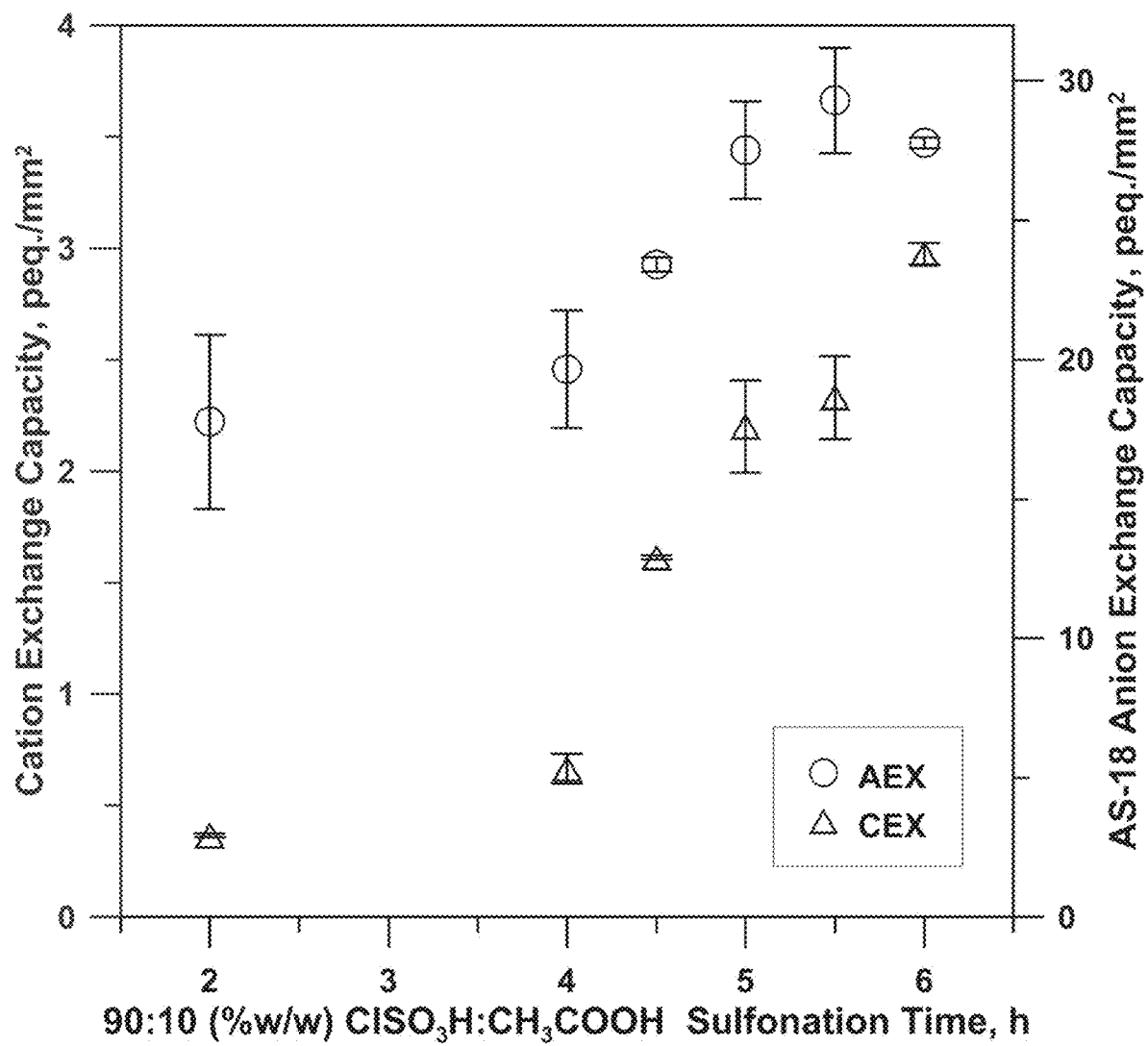
FIG. 9 is a plot comparing cation exchange capacity (sulfonated COP material) to anion exchange capacity (AS18 latex nanoparticle coating) for capillaries manufactured according to process 200 with varying extents of exposure to a sulfonation reagent (90 wt % $ClSO_3H$:10 wt % $CH_3COOH$).
Figure 10:
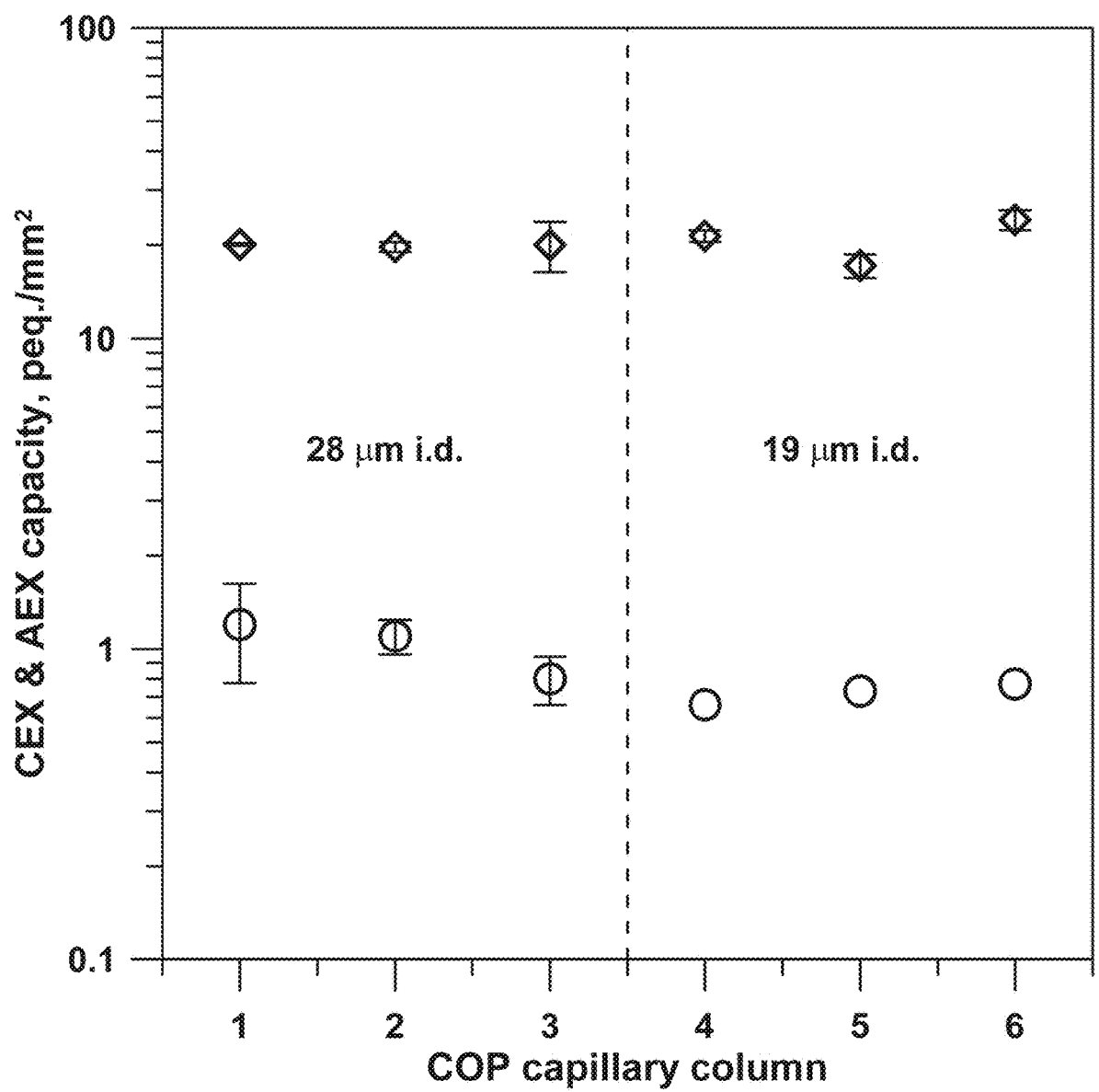
FIG. 10 is a plot comparing the reproducibility of cation exchange capacity (sulfonated COP material) and anion exchange capacity (AS18 latex nanoparticle coating) in capillaries manufactured according to process 200.

Packed columns including latex particles with extensively studied selectivities have been developed, but have generally not been used in suppressed hydroxide open tubular capillary ion chromatography due to the aforementioned instability of nanoparticle attachment to fused silica and PMMA materials. In going from —COOH based PMMA to —SO3H functionalized COP, the present columns provide for a stronger, base-stable attachment to a fully ionized strong acid site. With sufficiently large nanoparticles, e.g., AEX latex nanoparticles in the range of 60-200 nm, multilayer coverage by similarly charged materials is unlikely, or at least has never been reported [14], which enables consistent mass transfer behavior of neutrals through the nanoparticulate layer to the sulfonate-functionalized region 120. Applicants have also experimentally observed performance consistent with monolayer formation. Coating ~1 peq/mm$^2$ CEX capacity PMMA columns with AS18 latex [5] produces AEX capacities of ~10 peq/mm$^2$. Applicants' columns, coated according to process 200 and, specifically, steps 250-260 as described above, can exhibit an increase in CEX capacity of 650%, from 0.4 (Working Example 4) to 3 peq/mm$^2$ (Working Example 5) when increasing exposure time a 90% chlorosulfonic acid sulfonating reagent from 2 to 6 h; but, as shown in FIG. 9, upon coating with identical suspensions of AS18 latex nanoparticles, AEX capacity increases only by <60% from the least (Working Example 4, post-coating) to most sulfonated (Working Example 5, post-coating) examples. Indeed, for CEX capacities of 2-3 peq/mm$^2$ (>5 h sulfonation time in 90% chlorosulfonic acid sulfonating reagent), the AEX capacities were statistically indistinguishable (28.2±0.8 peq/mm$^2$). Additionally, as shown in FIG. 10, for CEX capacities around ~1 peq/mm$^2$ (open circles) AEX capacities of ~20 peq/mm$^2$ (open diamonds) are reproducibly realized with a coating of 65 nm AS18 latex nanoparticles regardless of column i.d., suggesting that much of the AEX capacity increase shown in FIG. 9 is due to the formation of an increasingly complete monolayer with increasingly complete sulfonation of the interior surface 110, not the formation of a multilayer coating of nanoparticles 130. Specifically, FIG. 10 shows results for three pairs of columns (pairs 1-3: 370 μm o.d./28 μm i.d. capillary) and three single columns (columns 4-6: 370 μm o.d./19 μm i.d.) sulfonated by exposure 230 to a reagent comprising 87.8% ClSO$_3$: 7.0% CH$_3$COOH:5.2% H$_2$SO$_4$ pumped at 15-50 psi for 4.5-5 hours (with the exception of column 6, which was exposed to a reagent comprising 87.7% ClSO$_3$: 12.3% CH$_3$COOH under otherwise identical conditions), then flushed as per step 230 and rinsed as per step 240 before exposure as per step 250 to an exemplary suspension of AS18 latex nanoparticles as previously described. Notably, in comparison to AS18 latex coated PMMA columns, the AEX capacity/unit area for the sulfonated COP based capillary columns is substantially greater. Electrostatically bonded latex nanoparticles did not perceptibly wash off in 5 mM hydroxide, whereas in applicants' prior work such bonding was not stable under the same conditions on PMMA. Specifically, columns coated with strong base AEX materials including AS5A latex (a 60 nm particulate latex with 4% crosslinking and alkanol quaternary ammonium anion exchange sites), AS11 latex (an 85 nm particulate latex with 6% crosslinking and alkanol quaternary ammonium anion exchange sites), AS16 latex (an 80 nm particulate latex with 1% crosslinking and alkanol quaternary ammonium anion exchange sites), AS18 latex (a 65 nm particulate latex with 8% crosslinking and alkanol quaternary ammonium anion exchange sites), and AminoPac PA10 (an 80 nm particulate latex with 20% crosslinking and alkyl ammonium anion exchange sites) maintained substantially the same exchange capacity when exposed to 5 mM KOH eluents, and some (with AS5A or AS18 latex coatings) would maintain substantially the same exchange capacity when exposed to up to 50 mM KOH for periods of 40-48 hours. It will be appreciated that other AEX nanoparticles 130, including latexes and other substrates bearing weak base, AEX-functional aliphatic amine functional groups (e.g., AminoPac PA10 or Thermo Fisher Scientific A37353 latex beads, a 60 nm particulate latex with amine groups attached to the terminus of aliphatic six-carbon spacer arms) could be employed depending upon the intended column application.

Since high CEX capacities lead to increased noise and require prolonged washing, an optimum combination of AEX capacity stability and baseline noise will likely be obtained with intermediate CEX capacities and prolonged washing both before and after latex coating. Even with low CEX capacity (1-3 peq/mm$^2$), some columns showed excellent base stability, with AS5A latex coated columns showing no discernible loss of capacity (30.5±1.8 peq/mm$^2$) over nearly 100 h of exposure to a 50 mM KOH eluent (interrupted only by intermittent capacity measurements). To put this in perspective in comparison with a commercial packed column, a consideration of the applicable phase ratio is appropriate. In other types of chromatography the phase ratio is defined as the volume of the mobile phase divided by the volume of the stationary phase; in an OT capillary column the former is the volume of the bore [15]. In the case of an ion exchange column, a more meaningful definition of the phase ratio $\beta_{iex}$ with any specific eluent in the column would be the ratio of the number of ionic equivalents present in the mobile phase per unit length of the column to the ion exchange capacity of the stationary phase represented in the same length. Obviously, the higher this number, the less is the retention. For an AS5A column in the packed vs. 19 μm or 28 μm bore OT format, Table 1 shows that the same eluent in an OT column format represents a 5-50× greater $\beta_{iex}$, depending on the type of latex used in the OT format coating 130; i.e., a proportionally lower eluent strength will be needed for an OT format column to obtain the same retention factors.

TABLE 1

Phase Ratios of Commercial Packed Columns vs. OT Columns

|  | AS5A Packed Commercial Column | AS11 Packed Commercial Column | AS16 Packed Commercial Column | AS18 Packed Commercial Column | Amino PAC PA10 Packed Commercial Column |
| --- | --- | --- | --- | --- | --- |
| i.d., mm | 4.0 | 4.0 | 4.0 | 4.0 | 2.0 |
| L, mm | 250 | 250 | 250 | 250 | 250 |
| Capacity, μeq | 40 | 45 | 170 | 285 | 285 |
| Cap., μeq/mm | 0.16 | 0.18 | 0.68 | 1.14 | 1.14 |
| Col. Vol/mm, mm$^3$ | 12.6 | 12.6 | 12.6 | 12.6 | 3.1 |
| [1]Mob Phase Vol/mm, mm$^3$ | 5.0 | 5.0 | 5.0 | 5.0 | 1.3 |
| [2]Mob Phase IEX cap/mm, μeq | 0.05 | 0.05 | 0.05 | 0.05 | 0.01 |

TABLE 1-continued

Phase Ratios of Commercial Packed Columns vs. OT Columns

| $\beta_{iex}$ | 0.31 | 0.28 | 0.07 | 0.04 | 0.01 |
|---|---|---|---|---|---|
| | 19 μm OTIC | 19 μm OTIC | 19 μm OTIC | 19 μm OTIC | 19 μm OTIC |
| i.d., mm | 0.019 | 0.019 | 0.019 | 0.019 | 0.019 |
| Surface area, mm²/mm length | 0.06 | 0.06 | 0.06 | 0.06 | 0.06 |
| AEX Capacity, peq/mm² | 30 | 25 | 11 | 34 | 100 |
| AEX Capacity, peq/mm length | 1.79 | 1.49 | 0.66 | 2.03 | 5.97 |
| Mob Phase Vol/mm, mm3 | 2.84E−04 | 2.84E−04 | 2.84E−04 | 2.84E−04 | 2.84E−04 |
| ²Mob Phase IEX cap/mm, peq | 2.84E+00 | 2.84E+00 | 2.84E+00 | 2.84E+00 | 2.84E+00 |
| $\beta_{iex}$ | 1.58 | 1.90 | 4.32 | 1.40 | 0.48 |
| | 28 μm OTIC | 28 μm OTIC | 28 μm OTIC | 28 μm OTIC | 28 μm OTIC |
| i.d., mm | 0.028 | 0.028 | 0.028 | 0.028 | 0.028 |
| Surface area, mm²/mm length | 0.09 | 0.09 | 0.09 | 0.09 | 0.09 |
| AEX Capacity, peq/mm² | 30 | 30 | 30 | 30 | 100 |
| AEX Capacity, peq/mm length | 2.64 | 2.64 | 2.64 | 2.64 | 8.80 |
| Mob Phase Vol/mm, mm3 | 6.16E−04 | 6.16E−04 | 6.16E−04 | 6.16E−04 | 6.16E−04 |
| ²Mob Phase IEX cap/mm, peq | 6.16E+00 | 6.16E+00 | 6.16E+00 | 6.16E+00 | 6.16E+00 |
| $\beta_{iex}$ | 2.33 | 2.33 | 2.33 | 2.33 | 0.70 |
| Mob phase relative power | | | | | |
| 28 μm OTIC vs packed col | 7.4 | 8.4 | 31.6 | 52.9 | 63.5 |
| 19 μm OTIC vs packed col | 5.0 | 6.8 | 58.4 | 31.7 | 43.1 |

¹Assumes a packing fraction of 60%
²Assumes 10 mM KOH eluent

Overall Performance

Figure 11A:
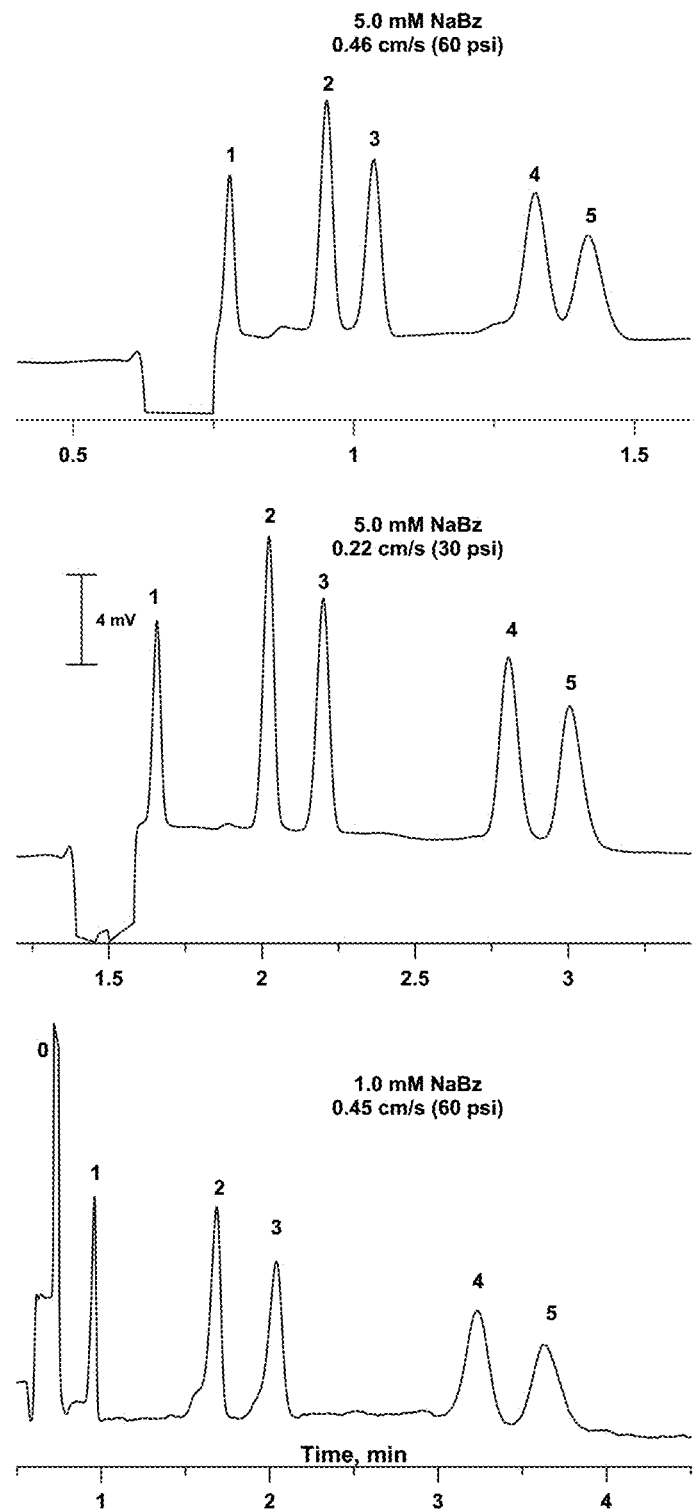
FIGS. 11A and 11B show chromatograms for AS18 latex coated COP based open tubular capillary columns with 20 cm and 30 cm effective lengths, respectively, using different eluents and eluent flow rates.
Figure 11B:
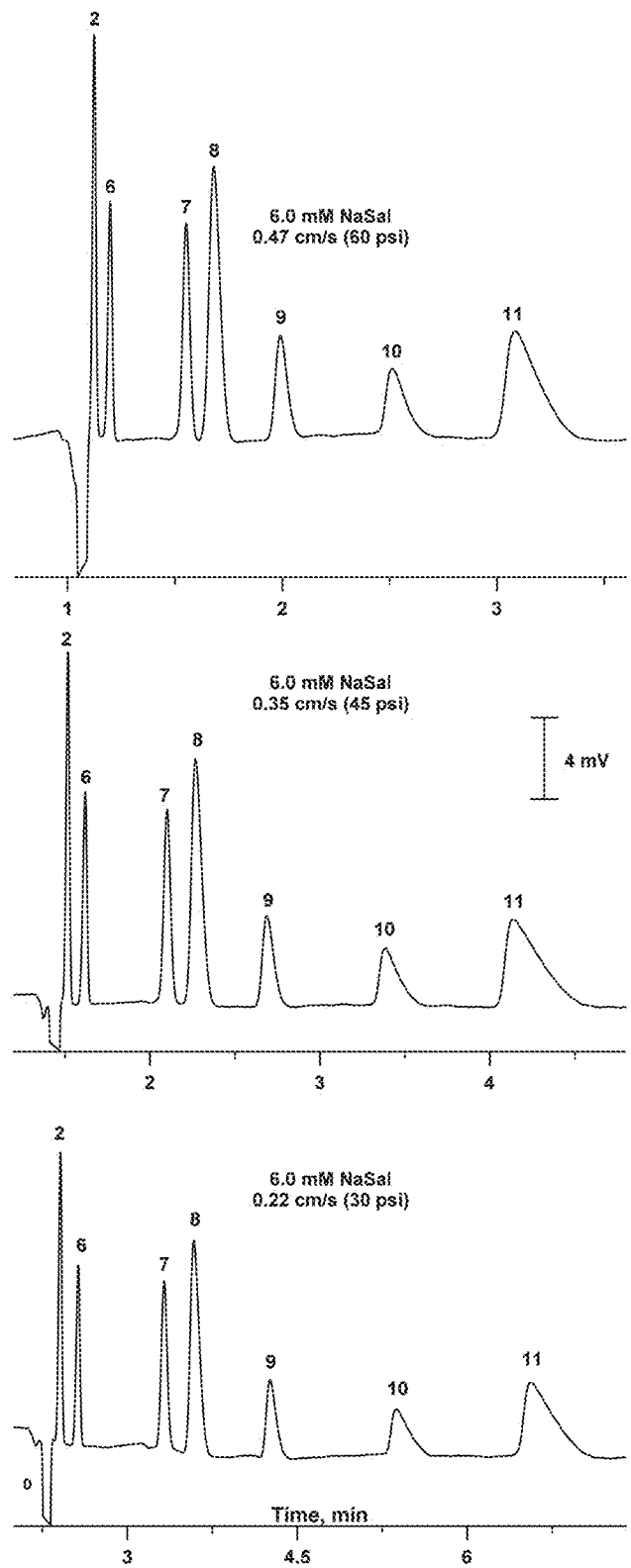
Figure 12:
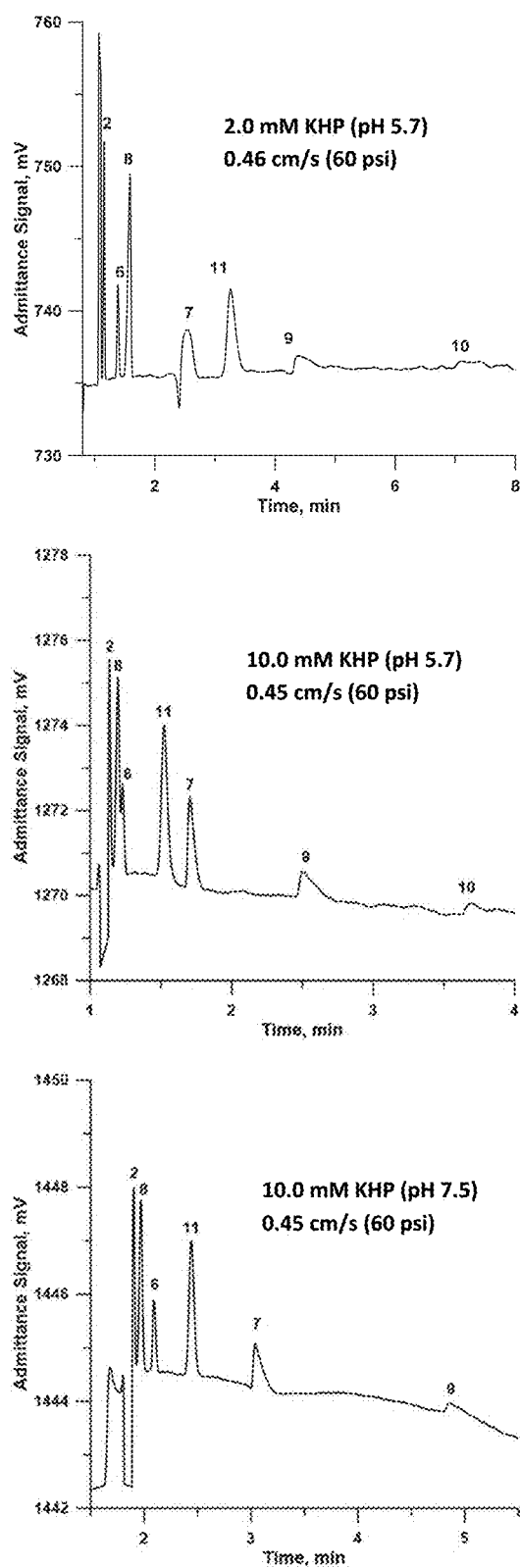
FIG. 12 shows chromatograms for AS18 latex coated COP based open tubular capillary columns using a divalent ion-based eluent at different concentrations and pHs.

Because the present columns have much greater capacity than corresponding PMMA columns [16], higher eluent concentrations and/or shorter column lengths (requiring very low pressures) can be used. FIGS. 11A and 11B illustrate operation with 22 cm (20 cm effective length) and 32 cm (30 cm effective length) 370 μm o.d./19 μm i.d. columns, respectively, at applied pressures of 6.6 to 19 psi, attaining flow velocities of 2.2-4.7 mm/s (flow rates of 39-80 nL/min), substantially above the Van Deemter optimum (1.2 mm/s). As shown in FIG. 10A, the standard 5 anion ($F^-$ (peak 1), $Cl^-$ (peak 2), $NO_2^-$ (peak 3), $Br^-$ (peak 4), and $NO_3^-$ (peak 5)) separation was possible within 4 min using 1.0 mM Na-Benzoate (NaBz) as the eluent. The same ions can be baseline separated in 1.6 min (the actual separation window being <45 s) with 5 mM NaBz at 60 psi and in about 3 min at 30 psi. As shown in FIG. 11B, with a stronger eluent of 6.0 mM sodium salicylate (NaSal) and greater effective length, a suite of seven anions including some very strongly retained species ($Cl^-$ (peak 2), $ClO_3^-$ (peak 6), $I^-$ (peak 7), $SO_4^{2-}$ (peak 8), $SCN^-$ (peak 9), $ClO_4^-$ (peak 10), and $S_2O_3^{2-}$ (peak 11)) were separated within 3.5 min at 60 psi. Respectable plate numbers were possible (best case efficiencies are as good as 93,000 and 128,000 plates/m for fluoride and chloride, respectively, in FIG. 11A middle and FIG. 11B bottom). As shown in FIG. 12, a divalent ion-based eluent, e.g., a salt such as potassium hydrogen phthalate (KHP), can be used to separate strongly retained anions and also offers the possibility of manipulating both eluent concentration and pH in order to change the ion elution orders, e.g., of $SO_4^{2-}$ (peak 8) and $ClO_3^-$ (peak 6) (2.0 mM KHP at pH 5.7 versus 10.0 mM KHP at pH 7.5), or $S_2O_3^{2-}$ (peak 11) and $I^-$ (peak 7) (2.0 mM KHP at pH 5.7 versus 10.0 mM KHP at pH 5.7).

Coiled Open Tubular Format Capillary Columns

Figure 13:
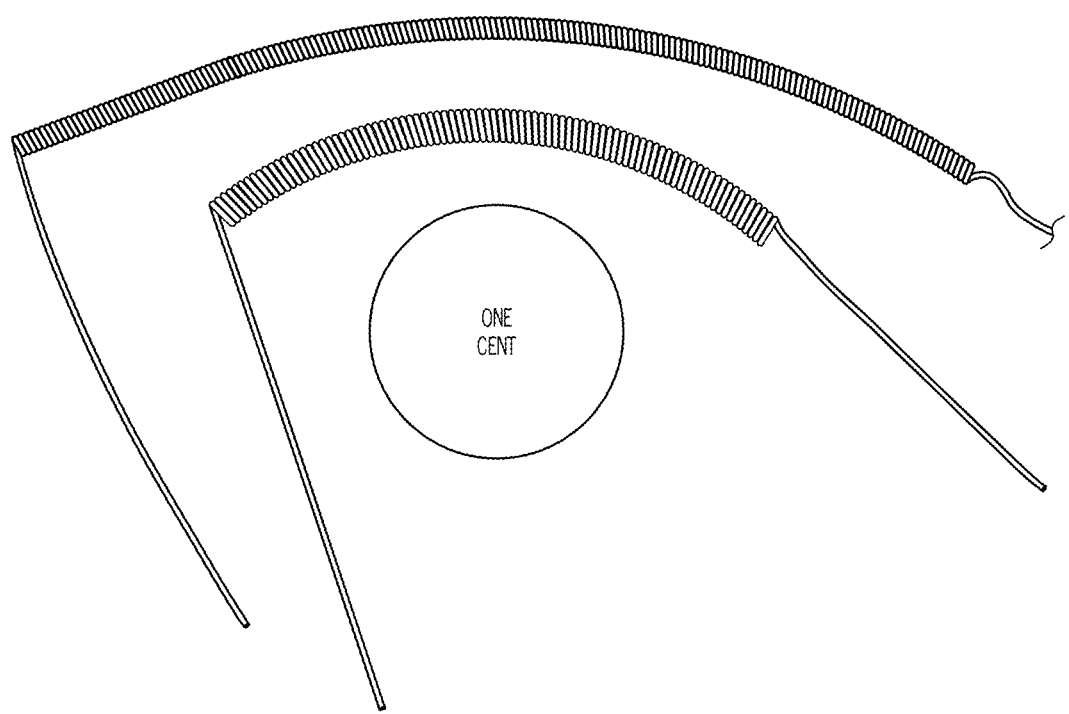
FIG. 13 is a photograph of COP based open tubular capillary columns after formation into helical coils by winding ~360 μm capillaries upon 1/16 inch (1.6 mm; top) and 1/32 inch (0.8 mm; bottom) diameter rods.
Figure 14:
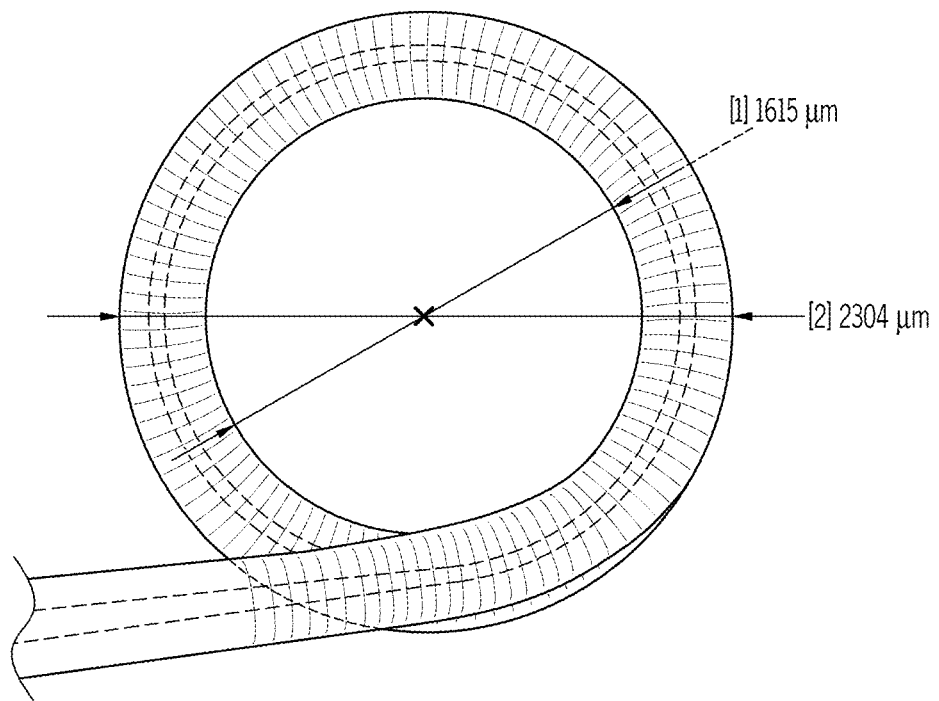
FIG. 14 is a photographic end view of the bottom helically coiled column of FIG. 13.

It is well-known that axial dispersion is the highest in a straight tube. Although the effects of deformed channels on mass transfer have been considered [17], and deformed connecting tubes have been used in at least one commercial liquid chromatograph [18], verification and application at capillary scales has not been done, likely because the silica capillaries in common use are brittle and exhibit a significant minimum bend radius. The present COP based capillaries have good flexibility, especially at moderately elevated temperatures (e.g., Zeonex® 330R has a glass transition temperature of 123° C., and a heat distortion temperature of 103° C.). The disclosed capillaries can be readily coiled with a bend radius, i.e., radius to the inside curvature, of at least about 0.8 mm (applicants have made helical coils with a smaller bend radius of 0.4 mm, but for these thick-walled capillaries the inner surface appears to become damaged—using thin walled capillaries and slowing the bending process would be likely to permit bend radii of at least 0.4 mm) up to about 2.0 mm where beneficial effects become minimal. FIG. 13 shows exemplary COP based capillary columns that have been coiled with 0.4 mm and 0.8 mm bend radii (producing $d_c$ values, equal to the inner diameter of the coil plus the capillary tube diameter of 1.17 and 1.97 mm, respectively). FIG. 14 shows an end view of the exemplary 0.8 mm bend radius column, with a corresponding inner diameter of the coil of about 1.6 mm, a corresponding outer diameter of the coil of about 2.3 mm, and a $d_c$ of 1.97 mm (the distance from bore to bore along a diameter of the column, or approximately the inner diameter plus the capillary diameter).

The column 100 may be coiled, when heated, around a form such as a rod. For example, applicants have heated straight capillaries in boiling water and then wound the capillaries, while immersed, around 0.8 and 1.6 mm diameter metal rods. The formed, helically coiled column may then be allowed to cool and removed from the form. Preferably, the ends 302 and 304 of the capillary are kept straight and taped off to prevent water from entering the capillary during coiling (if water or another heated fluid is used; it will be appreciated that air or other gasses could also be used in automated coiling processes). Such ends 302 and 304 would also permit coiling prior to performance of the process 200, although, as discussed below, coiling can also be performed after sulfonation and coating.

Figure 15:
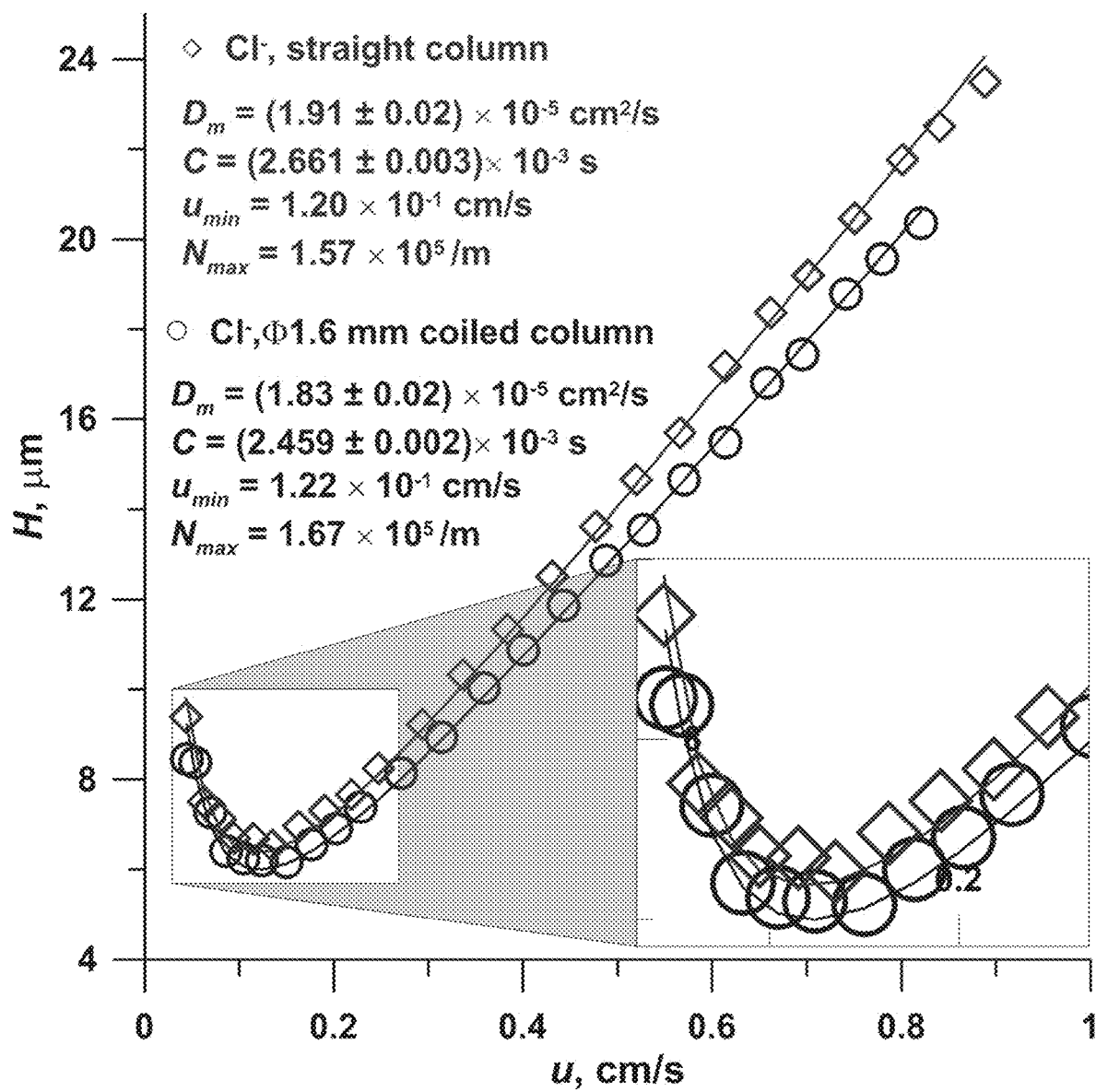
FIG. 15 is a fitted Van Deemter plot of chloride ion plate height versus flow velocity in straight (diamond) and helically coiled (circle) AS18 latex coated COP based capillary column configurations.

Qualitatively, the centrifugal component in helical flow (the pressure is slightly greater than for a straight tube of identical length) flattens the parabolic velocity profile across the bore, reducing axial dispersion while simultaneously increasing mass transport to the wall. The key parameter is the Dean number $N_{De}=N_{Re}*\sqrt{(d_t/d_c)}$ where $N_{Re}$ is the Reynold's number, $d_t$ and $d_c$ are the bore diameter and coil diameter, respectively; with centrifugal effects increasing with increasing $N_{De}$ (essentially zero for straight tubes or large diameter coils). FIG. 15 shows Van Deemter curves for a chloride analyte run on an 733 mm long (effective length), 370 μm o.d./19 μm i.d. AS18 latex coated COP based open tubular capillary column using a 4.0 mM sodium salicylate (NaSal) eluent pumped at various flow velocities (from 0.05 to 0.9 cm/s). The same column was first employed as a straight separation column (782 mm total length), then formed into a $d_c$=1.97 mm column like that that shown in FIGS. 13-14 and employed as a helically coiled separation column (with 674 mm of column length being coiled). Coiling perceptibly improves the column efficiency for chloride, and the same effect is observed for the unretained water dip. Experimentally, the minimum plate height for chloride changes from 5.9 to 5.7 μm; with the absolute differences in plate heights increasing with increasing flow velocity. The respective best fits to the Van Deemter Equation (i.e., h=B/u+C*u) for the straight and coiled columns are:

$h=1.91\times10^{-5}/u+2.66\times10^{-3} s^{-1}*u$ straight column $h=1.83\times10^{-5}/u+2.46\times10^{-3} s^{-1}*u$ coiled column where h is in cm and u is in cm/s. The B-term and, especially, the C-term both decrease on coiling.

Figure 16:
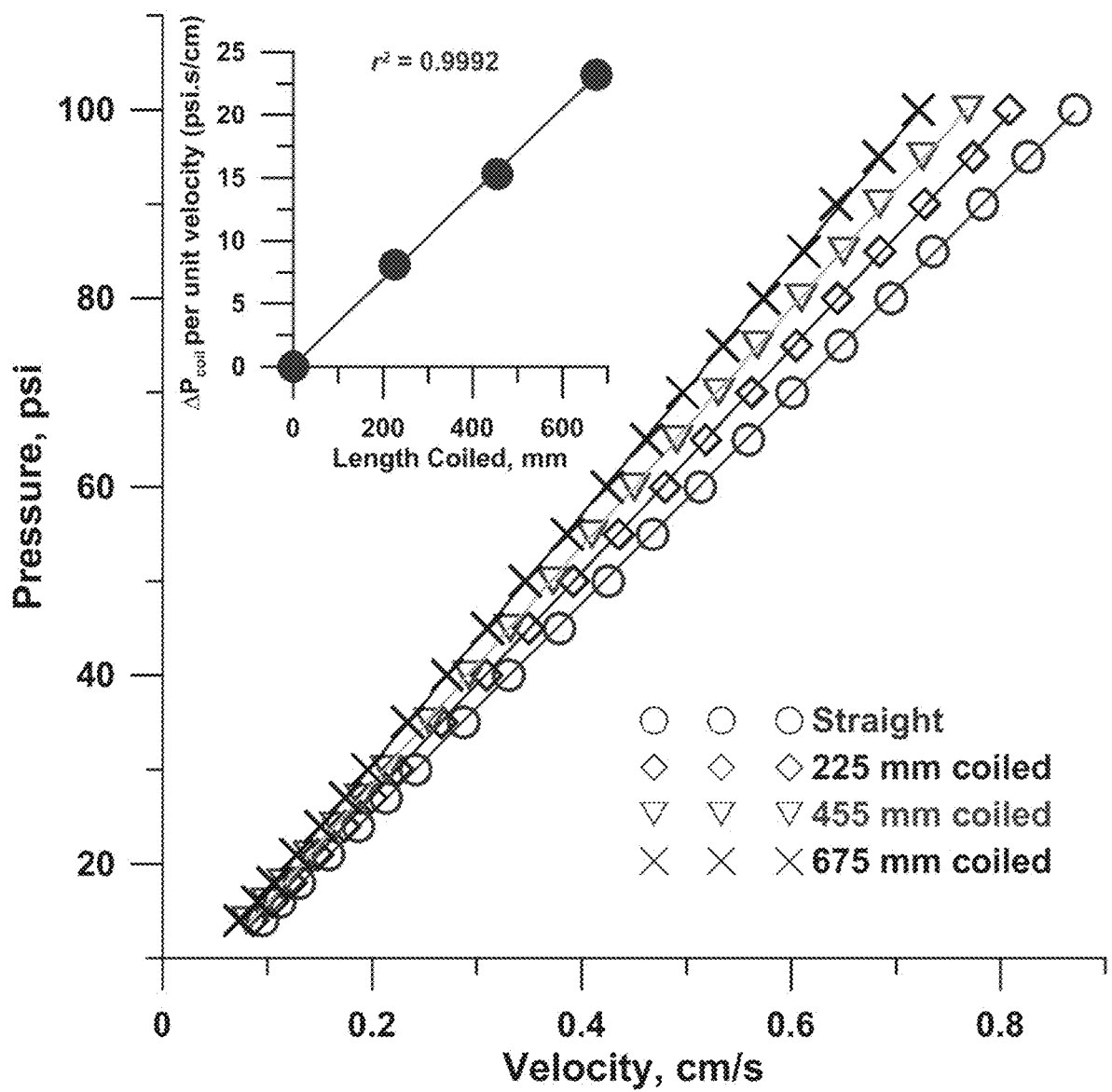
FIG. 16 is a plot of applied pressure versus eluent flow velocity for an open tubular capillary column configured as a completely straight column (733 mm effective length; circles), as a partially helically coiled column (225 mm of length coiled to $d_c$=1.97 mm; diamonds), as a partially helically coiled column (455 mm of length coiled to $d_c$=1.97 mm; triangles), and an almost completely helically coiled column (675 mm of length coiled to $d_c$=1.97 mm; X-s). The inset graph illustrates the experimentally observed fit of a model of additional pressure loss, due to coiling, versus flow velocity as described by Equation (1).

The pressure drop along the column 100 is greater when formed into helical coil versus a straight configuration. The difference between configurations will be proportional to the ¼th power to the square root of $N_{De}$, depending upon the specific conditions [15]. In one experiment, the pressure drop of a 78.2 cm long, 19 μm i.d. straight column was measured at different flow rates, and then the same measurements were repeated as the column was partially coiled for 22.5 cm, 45.5 cm, and 67.5 cm of the column length around a 0.8 mm diameter support rod. FIG. 16 shows that the overall increase in pressure upon coiling to 0.4 mm bend radius can be given by the equation:

additional $\Delta P/u$ (psi·s/cm)=(3.4±0.1)×10$^{-2}$*cm of tube coiled+0.12±0.28  Eq. (1)

and that the pressure drop increase for coiling to this comparatively small diameter helical coil is equivalent to a ~24% increase in straight column length.

CONCLUSION

In summary, the applicants have disclosed sulfonated polyolefin based open tubular capillary separation columns, and AEX nanoparticle coated (sulfonated polyolefin based) open tubular capillary anion separation columns, which can survive hydroxide eluents of high enough concentrations to carry out charge-based separations, and thus making them uniquely suitable for Suppressed Conductometric Open Tubular Ion Chromatography (SC-OTIC) as otherwise described in U.S. patent application Ser. No. 15/258,493, the entirety of which is incorporated by reference. The AEX capacities of exemplary coated COP OT columns can be 2× or more of those of AEX coated PMMA and silica columns. Plate counts for 19 μm i.d. columns can exceed 125,000 plates/m, so that with an effective length of only 20-30 cm, the same as that of traditional packed columns, the disclosed columns can provide good separation of many common anions in a short period with appropriate eluents. The flexibility of the polyolefin materials allows the capillaries to be coiled with sub-mm bend radii, resulting in a significant increase in column efficiency. Some polyolefin materials, such as a commercially available norbornene-based COP material, advantageously offer reasonably transparent windows at for optical spectrometry that add to the columns' versatility.

REFERENCES

[1] Cheong, W. J.; Ali, F.; Kim, Y. S.; Lee, J. W. *J. Chromatogr. A* 2013, 1308, 1-24.
[2] Pyo, D. J.; Dasgupta, P. K.; Yengoyan, L. S. *Anal. Sci.* 1997, 13 (suppl), 185-190.
[3] Breadmore, M. C.; Macka, M.; Avdalovic, N.; Haddad, P. R. *Analyst* 2000, 125, 1235-1241.
[4] Zhang, S. S.; Macka, M.; Haddad, P. R. *Electrophoresis* 2006, 27, 1069-1077.
[5] Zhang, M.; Yang, B. C.; Dasgupta, P. K. Anal. Chem. 2013, 85, 7994-8000.
[6] Yang, B. C.; Zhang, M.; Kanyanee, T.; Stamos, B. N.; Dasgupta, P. K. *Anal. Chem.* 2014, 86, 11,554-11,561.
[7] http://www.cyclo-olefin-polymers.com/Whats the difference between COP and COC.aspx
[8] Isono, T.; Satoh, T. in Encyclopedia of Polymeric Nanomaterials, Kobayashi, S.; Müllen, K. Eds, Springer, 2014. pp 1-8.
[9] Zeon Co. http://www.zeon.co.jp/business_e/enterprise/speplast/speplast1_8.html
[10] Knox, J. H.; Gilbert, M. T. *J. Chromatogr.* 1979, 186, 405-418.
[11] Bakker, B. H.; Cerfontain, H. *Eur. J. Org. Chem.* 1999 (1), 91-96.
[12] Cremlyn, R. J. W. *Chlorosulfonic Acid: A Versatile Reagent*; Royal Society of Chemistry: Cambridge, UK, 2002.
[13] http://www.chemicalize.org/structure/#!mol=sulfonic+acid+ion&source=fp
[14] Slingsby, R. W.; Pohl, C. A. *J. Chromatogr.* 1988, 458, 241-253.
[15] International Union of Pure and Applied Chemistry (IUPAC). "The Gold Book". http://goldbook.iupac.org/P04531.html
[16] Zhang, M.; Stamos, B. N.; Dasgupta, P. K. *Anal. Chem.* 2014, 86, 11,547-11,553.
[17] Halasz, I. Journal of Chromatography 1979, 173, 229-247.
[18] Perkin-Elmer Corp. The TriDet HPLC, see e.g., http://pubs.acs.org/doi/pdf/10.1021/ac00281a734.
[19] Ramshankar, R.; Sreenivasan, K. R. *Phys. Fluids* 1988, 31, 1339-1347.

What is claimed is:
1. An open tubular capillary column for liquid and ion chromatography, the column comprising:
   an ionically impermeable polyolefin capillary;
   the capillary having a bore with a sulfonate-group-functionalized internal surface of a polyolefin material of the ionically impermeable polyolefin capillary.
2. The open tubular capillary column of claim 1, wherein the sulfonate-group-functionalized internal surface provides a sulfonate-group associated cation exchange capacity of at most 9 peq/mm$^2$.

3. The open tubular capillary column of claim 2, wherein the sulfonate-group-functionalized internal surface provides the sulfonate-group associated cation exchange capacity of at least 0.5 peq/mm$^2$.

4. The open tubular capillary column of claim 1, wherein the sulfonate-group-functionalized internal surface provides a sulfonate-group associated cation exchange capacity of at most 300 peq/mm$^2$.

5. The open tubular capillary column of claim 1, wherein the bore further includes a coating of anion exchanging nanoparticles electrostatically bound to the sulfonate-group-functionalized internal surface.

6. The open tubular capillary column of claim 5, wherein the anion exchanging nanoparticles are comprised of quaternary-ammonium-group-functionalized latex nanoparticles.

7. The open tubular capillary column of claim 6, wherein the quaternary-ammonium-group-functionalized latex nanoparticles form a monolayer over the sulfonate-group-functionalized internal surface.

8. The open tubular capillary column of claim 1, wherein a sulfonate-group-functionalization extends into a region disposed under the internal surface of the bore.

9. An open tubular capillary column for liquid and ion chromatography, the column comprising:
   an ionically impermeable capillary of a polyolefin material;
   the capillary having a bore including an internal surface of the polyolefin material of the ionically impermeable capillary that has been exposed to a sulfonating reagent comprising chlorosulfonic acid (ClSO$_3$H) to sulfonate the polyolefin material to a sulfonated polyolefin material.

10. The open tubular capillary column of claim 9, wherein the sulfonating agent is comprised from 85 wt % to 95 wt % chlorosulfonic acid.

11. The open tubular capillary column of claim 10, wherein the internal surface was exposed to the sulfonating agent for at most 8 hours.

12. The open tubular capillary column of claim 11, wherein the internal surface was exposed to the sulfonating agent for at least 2 hours.

13. The open tubular capillary column of claim 9, wherein the bore further includes a coating formed by exposing the sulfonated polyolefin material of the internal surface to a solution of suspended anion exchanging nanoparticles.

14. The open tubular capillary column of claim 13, wherein the anion exchanging nanoparticles are comprised of quaternary-ammonium-group-functionalized latex nanoparticles.

15. The open tubular capillary column of claim 14, wherein the quaternary-ammonium-group-functionalized latex nanoparticles form a monolayer over the sulfonated polyolefin material of the internal surface.

16. The open tubular capillary column of claim 9, wherein the polyolefin polymer material comprises a cycloolefin polymer.

17. The open tubular capillary column of claim 16, wherein the cycloolefin polymer material comprises a norbornene-type cycloolefin polymer.

18. An open tubular capillary column for liquid and ion chromatography, the column comprising:
   an ionically impermeable polyolefin capillary;
   the capillary having a bore with a sulfonate-group-functionalized internal surface of a polyolefin material of the ionically impermeable polyolefin capillary, wherein the polyolefin material comprises a cycloolefin polymer.

19. The open tubular capillary column of claim 18, wherein the cycloolefin polymer material comprises a norbornene-type cycloolefin polymer.

* * * * *